US009372696B2

(12) United States Patent
Henry et al.

(10) Patent No.: US 9,372,696 B2
(45) Date of Patent: Jun. 21, 2016

(54) MICROPROCESSOR WITH COMPRESSED AND UNCOMPRESSED MICROCODE MEMORIES

(71) Applicant: VIA TECHNOLOGIES, INC., New Taipei (TW)

(72) Inventors: G. Glenn Henry, Austin, TX (US); Terry Parks, Austin, TX (US); Brent Bean, Austin, TX (US)

(73) Assignee: VIA TECHNOLOGIES, INC., New Taipei (TW)

( * ) Notice: Subject to any disclaimer, the term of this patent is extended or adjusted under 35 U.S.C. 154(b) by 351 days.

(21) Appl. No.: 14/088,620

(22) Filed: Nov. 25, 2013

(65) Prior Publication Data

US 2015/0113250 A1    Apr. 23, 2015

Related U.S. Application Data

(60) Provisional application No. 61/893,126, filed on Oct. 18, 2013, provisional application No. 61/897,327, filed on Oct. 30, 2013.

(51) Int. Cl.
*G06F 9/30* (2006.01)
*G06F 9/32* (2006.01)
*G06F 9/38* (2006.01)

(52) U.S. Cl.
CPC ........ *G06F 9/30145* (2013.01); *G06F 9/30178* (2013.01); *G06F 9/328* (2013.01); *G06F 9/3891* (2013.01)

(58) Field of Classification Search
None
See application file for complete search history.

(56) References Cited

U.S. PATENT DOCUMENTS

| | | | | |
|---|---|---|---|---|
| 4,835,679 A * | 5/1989 | Kida | ....................... | G06F 9/261 712/212 |
| 5,640,248 A | 6/1997 | Hirokawa | | |
| 5,745,058 A * | 4/1998 | Auerbach | ............... | H03M 7/30 341/51 |
| 5,796,972 A * | 8/1998 | Johnson | .................... | G06F 8/66 712/208 |
| 6,049,672 A * | 4/2000 | Shiell | ........................ | G06F 8/66 711/102 |
| 6,199,126 B1 * | 3/2001 | Auerbach | ............. | G06F 9/3017 710/68 |
| 6,263,429 B1 * | 7/2001 | Siska | .................... | G06F 8/4436 712/210 |
| 6,634,017 B2 | 10/2003 | Matsui et al. | | |
| 7,095,342 B1 * | 8/2006 | Hum | ................... | H03M 7/3084 341/51 |
| 7,743,232 B2 * | 6/2010 | Shen | ........................ | G06F 9/28 712/211 |

(Continued)

FOREIGN PATENT DOCUMENTS

WO    WO95/27244    10/1995
WO    WO97/48041    12/1997

*Primary Examiner* — Eric Coleman
(74) *Attorney, Agent, or Firm* — E. Alan Davis; Eric W. Cernyar; James W. Huffman

(57) ABSTRACT

A microprocessor includes a plurality of memories each configured to hold microcode instructions. At least a first of the plurality of memories is configured to provide M-bit wide words of compressed microcode instructions, and at least a second of the plurality of memories is configured to provide N-bit wide words of uncompressed microcode instructions. M and N are integers greater than zero and N is greater than M. The microprocessor also includes a decompression unit configured to decompress the compressed microcode instructions after being fetched from the at least a first of the plurality of memories and before being executed.

19 Claims, 13 Drawing Sheets

(56) References Cited

U.S. PATENT DOCUMENTS

| | | | |
|---|---|---|---|
| 2001/0010072 A1* | 7/2001 | Yoshida | G06F 9/30174 712/209 |
| 2001/0013093 A1* | 8/2001 | Banno | G06F 9/30178 712/210 |
| 2002/0124161 A1* | 9/2002 | Moyer | G06F 8/66 712/234 |
| 2003/0131216 A1 | 7/2003 | Henkel et al. | |
| 2003/0212879 A1 | 11/2003 | Henkel et al. | |
| 2004/0059892 A1* | 3/2004 | Paolucci | G06F 9/30178 712/208 |
| 2007/0022279 A1* | 1/2007 | Wu | G06F 8/4436 712/245 |
| 2009/0089507 A1* | 4/2009 | Chen | G06F 8/433 711/125 |
| 2011/0161575 A1 | 6/2011 | Collins | |

* cited by examiner

MICROPROCESSOR WITH COMPRESSED AND UNCOMPRESSED MICROCODE MEMORIES

CROSS REFERENCE TO RELATED APPLICATION(S)

This application claims priority based on the following U.S. Provisional applications, each of which is hereby incorporated by reference in its entirety.

| Ser. No. | Filing Date | Title |
| --- | --- | --- |
| 61/893,126 | Oct. 18, 2013 | SELECTIVELY COMPRESSED MICROCODE |
| 61/897,327 | Oct. 30, 2013 | MICROPROCESSOR WITH COMPRESSED AND UNCOMPRESSED MICROCODE MEMORIES |

BACKGROUND

Modern microprocessors include typically microcode to implement complex and/or infrequently executed instructions of the microprocessor instruction set architecture. An advantage of implementing some instructions of the instruction set architecture in microcode is that it may reduce the complexity of other functional units of the microprocessor, such as the execution units. As the number and complexity of instructions grows in an instruction set architecture, so does the need for microcode, and particularly, for non-volatile memory storage in the microprocessor (such as read-only memory (ROM)) to store the microcode. However, the increased memory storage may undesirably consume a significant amount of real estate on the microprocessor. This problem may be exacerbated by the proliferation of cores in multi-core microprocessors each having memory storage for storing the microcode.

BRIEF SUMMARY

In one aspect the present invention provides a microprocessor. The microprocessor includes a plurality of memories each configured to hold microcode instructions. At least a first of the plurality of memories is configured to provide M-bit wide words of compressed microcode instructions, and at least a second of the plurality of memories is configured to provide N-bit wide words of uncompressed microcode instructions. M and N are integers greater than zero and N is greater than M. The microprocessor also includes a decompression unit configured to decompress the compressed microcode instructions after being fetched from the at least a first of the plurality of memories and before being executed.

In another aspect the present invention provides a method for selectively decompressing microcode instructions in a microprocessor having a plurality of memories each configured to hold microcode instructions. The method includes fetching, from at least a first of the plurality of memories, M-bit wide words of compressed microcode instructions. The method also includes fetching, from at least a second of the plurality of memories, N-bit wide words of uncompressed microcode instructions. M and N are integers greater than zero and N is greater than M. The method also includes decompressing the compressed microcode instructions fetched from the at least a first of the plurality of memories. The method also includes passing on the uncompressed microcode instructions without decompression.

In yet another aspect the present invention provides a computer program product encoded in at least one non-transitory computer usable medium for use with a computing device, the computer program product comprising computer usable program code embodied in said medium for specifying a microprocessor. The computer usable program code includes first program code for specifying a plurality of memories, each configured to hold microcode instructions. At least a first of the plurality of memories is configured to provide M-bit wide words of compressed microcode instructions. At least a second of the plurality of memories is configured to provide N-bit wide words of uncompressed microcode instructions. M and N are integers greater than zero and N is greater than M. The computer usable program code also includes second program code for specifying a decompression unit, configured to decompress the compressed microcode instructions after being fetched from the at least a first of the plurality of memories and before being executed.

DETAILED DESCRIPTION OF THE EMBODIMENTS

Embodiments of a microprocessor are described in which most, but not all, of the microcode instructions held in a microcode memory are compressed. The microprocessor includes a decompression unit that selectively decompresses the selectively compressed microcode instructions (e.g., decompression unit 239 of FIG. 2). In some cases, a microcode instruction held in the memory is not compressed and is therefore wider than the width of a word of the memory that holds it. In such cases, the microcode instruction is split into two parts and the two parts are stored in two separate words of the memory. In these cases, a predetermined value—referred to herein as an "escape" indicator—is placed (for example, by a microcode assembler) in a predetermined portion of the first word of the two-word sequence. When the decompression unit detects the presence of the escape indicator in the first word fetched from the memory, the decompression unit joins the appropriate portions of the two words to generate the uncompressed microcode instruction. This advantageously provides the ability for the vast majority of the microcode instructions held in the memory to be compressed and enables them to be less wide than in an implementation that does not include the selective compression mechanism.

Furthermore, embodiments are described of a microprocessor having multiple microcode memories, at least one of which is the width of a compressed microcode instruction for providing compressed microcode instructions, and at least one of which is the width of an uncompressed microcode instruction for providing uncompressed microcode instructions. Various combinations of compressed-width and uncompressed-width core, uncore and patch microcode memories are described.

Figure 1:
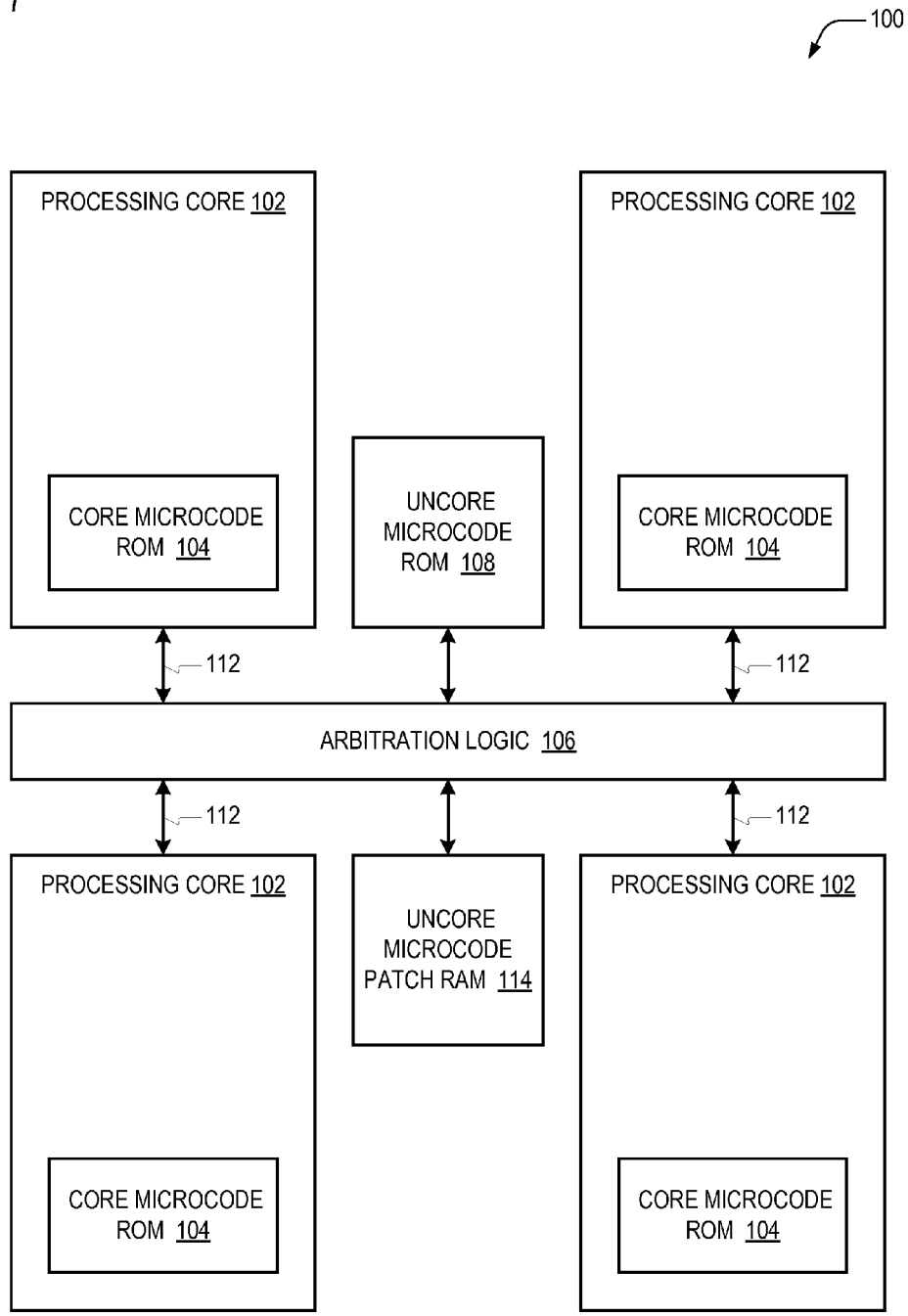
FIG. 1 is a block diagram illustrating a multi-core microprocessor.

Referring now to FIG. 1, a block diagram illustrating a multi-core microprocessor 100 is shown. Preferably, the microprocessor 100 physically resides on a single integrated circuit. The microprocessor 100 includes a plurality of processing cores 102, an uncore read-only memory (ROM) 108 shared by the plurality of cores 102, an uncore microcode patch random access memory (RAM) 114 shared by the plurality of cores 102, and arbitration logic 106 (also referred to as control logic) that couples the cores 102 to the uncore ROM 108 and the uncore microcode patch RAM 114. Each of the cores 102 includes a corresponding core ROM 104 that is not shared by the other cores 102, but is instead private, or local, to the core 102. Each of the cores 102 is coupled to the arbitration logic 106 by a corresponding bus 112. The uncore ROM 108, uncore patch RAM 114 and core ROMs 104 hold microcode instructions.

The microprocessor 100 includes a portion referred to as the "uncore." The uncore is the portion of the microprocessor 100 that is not part of any of the processing cores 102. The uncore ROM 108 and patch RAM 114 reside in the uncore of the microprocessor 100. Preferably, the cores 102 are a single design that is replicated multiple times. In the embodiment of FIG. 1, four cores 102 are shown, although other embodiments are contemplated with different numbers of cores 102. The arbitration logic 106 also resides in the uncore portion of the microprocessor 100. The arbitration logic 106 arbitrates among the cores 102 as they request access to the uncore ROM 108 or the uncore patch RAM 114.

The uncore ROM 108 provides some number of words—referred to as "J"—of storage for microcode instructions that are fetchable by all of the cores 102. Each of the core ROMs 104 provides some number of words—referred to as "K"—of storage for microcode instructions that are fetchable only by the corresponding core 102. The J words of the uncore ROM 108 and the K words of the corresponding core ROM 104 reside at different address locations of the microcode memory address space of the core 102. Thus, collectively, for each core 102, its corresponding core ROM 104 and the uncore ROM 108 provide J+K words of storage for microcode instructions that are fetchable by the core 102.

In one embodiment, the uncore ROM 108 has J addressable memory locations each being the width of a compressed microcode instruction. In one embodiment, each core ROM 108 has K addressable memory locations each being the width of a compressed microcode instruction. In one embodiment, the width of a compressed microcode instruction is 28 bits, and the width of an uncompressed, or decompressed, microcode instruction is 38 bits.

In one embodiment, the uncore ROM 108 includes a single read port that is shared by all of the cores 102, and the arbitration logic 106 serves to grant use of the read port by the cores 102 according to an arbitration algorithm. In one embodiment, if only one core 102 is requesting access to the uncore ROM 108 in a given request cycle, then the arbitration logic 106 grants the single requesting core 102; whereas, if multiple cores 102 are requesting access to the uncore ROM 108 in a given request cycle, then the arbitration logic 106 grants access in round-robin order. However, other arbitration algorithms are contemplated. Other embodiments are contemplated in which the uncore ROM 108 includes a plurality of read ports that are shared by the cores 102. Other embodiments are contemplated in which the uncore ROM 108 includes a read port for each of the cores 102. However, it is noted that the more read ports included in the uncore ROM 108 the larger it will be such that the benefit in terms of die area may be reduced.

An advantage of the presence of the uncore ROM 108 is that it potentially provides a reduction in the size of the integrated circuit 100 in exchange for an increase in latency when accessing microcode instructions from the uncore ROM 108. The latency increase may be attributed to the greater distance of the uncore ROM 108 from the microcode unit of each of the cores 102. That is, propagation delays may be increased due to the extra distance, thereby requiring additional pipeline staging and associated additional clock cycles. Additionally, the latency increase may be attributed to the fact that the uncore ROM 108 is a shared resource that must be arbitrated for among the multiple cores 102 requesting access to it. Furthermore, the shared nature of the uncore ROM 108 may result in a variable access latency, unlike the core ROM 104 that may have a fixed latency. However, the increased/variable latency may be a desirable tradeoff for the reduced die size in some instances. Advantageously, the size of the uncore ROM 108 may be further reduced by the selective microcode compression embodiments described herein.

Figure 2:
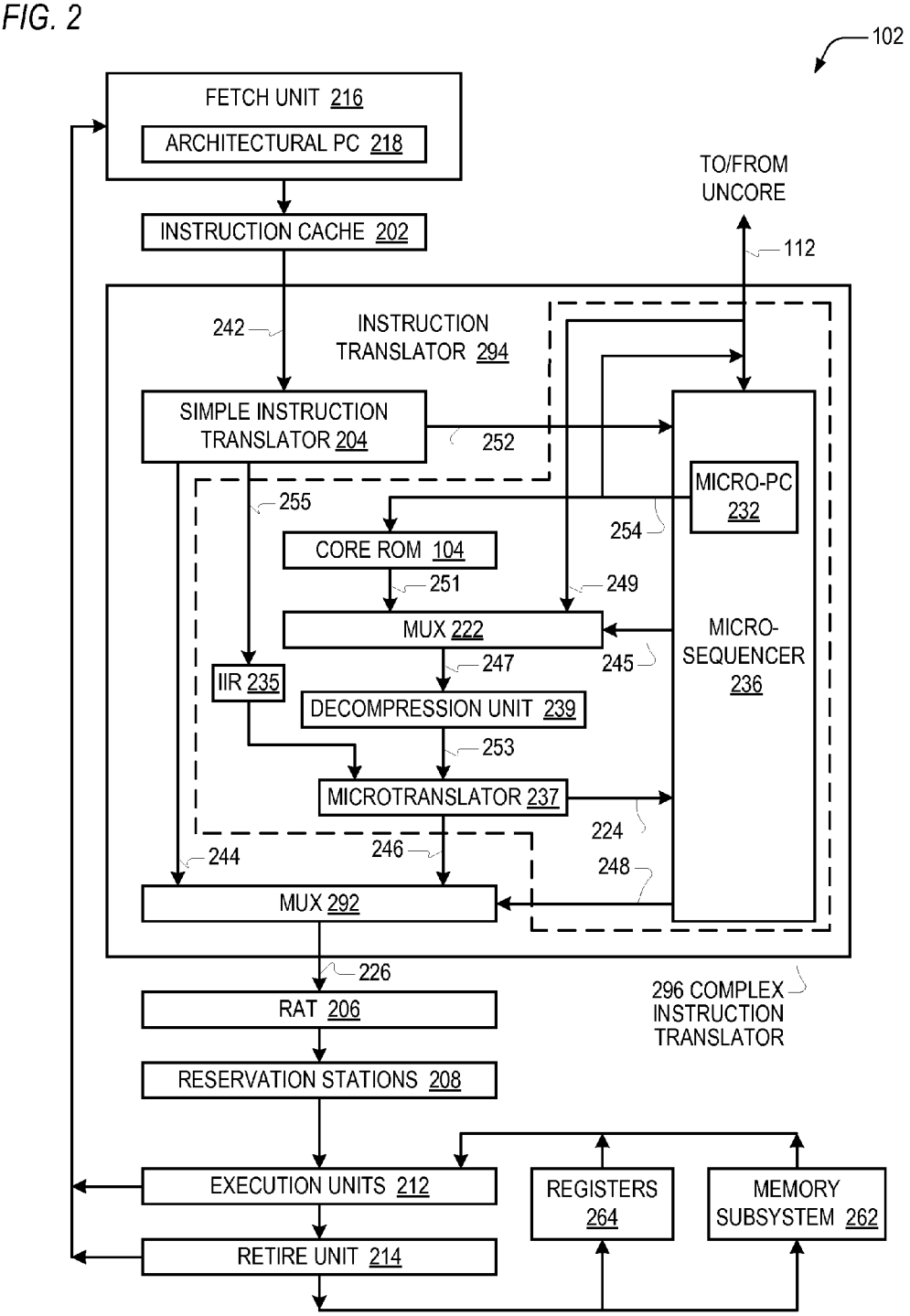
FIG. 2 is a block diagram illustrating in more detail a processing core of FIG. 1.

Referring now to FIG. 2, a block diagram illustrating in more detail a processing core 102 of FIG. 1 is shown. The core 102 includes a pipeline of stages that includes various functional units. Preferably, the core 102 is a superscalar, out-of-order execution, pipelined data processing core. The core 102 includes an instruction fetch unit 216, coupled to an instruction cache 202, coupled to an instruction translator 294, coupled to a register alias table (RAT) 206, coupled to reservation stations 208, coupled to execution units 212, coupled to a retire unit 214. The execution units 212 receive operands from registers 264 (both architectural and non-architectural) and from a memory subsystem 262. The retire unit 214 retires microinstruction results to the registers 264 and memory subsystem 262. The instruction translator 294 is coupled to the arbitration logic 106 via the bus 112 of FIG. 1. The fetch unit 216 includes the architectural program counter (PC) 218 of the core 102. The retire unit 214 updates the architectural PC 218 as it retires instructions. The fetch unit 216 provides an architectural instruction fetch address to the instruction cache 202. The fetch unit 216 generates the architectural fetch address based on the architectural PC 218. Additionally, the execution units 212 may execute branch instructions and provide branch target addresses to the fetch unit 216, which it uses to generate the architectural fetch address. Finally, branch predictors (not shown) of the fetch unit 216 may provide predicted branch target addresses used to generate the architectural fetch address. The architectural PC 218 is distinct from a non-architectural microcode program counter (micro-PC) 224 maintained by the instruction translator 294, and the architectural fetch address generated by the fetch unit 216 to the instruction cache 202 is distinct from a non-architectural microcode fetch address 254 generated by a microsequencer 236 (also referred to as control logic) of the instruction translator 294, all of which are described below.

The instruction cache 202 caches architectural instructions 242, also referred to as macroinstructions 242 or ISA instructions 242, which are instructions defined by the instruction set architecture of the microprocessor 100 (e.g., the x86, ARM, SPARC, etc. architectures). The instruction translator 294 translates the macroinstructions 242 into microinstructions 226 of the microinstruction set of a microarchitecture of the core 102, which preferably has characteristics typically associated with RISC architectures.

The instruction translator 294 provides the microinstructions to the RAT 206 in program order. The RAT 206 allocates entries for the microinstructions in a reorder buffer of the retire unit 214 in program order. The RAT 206 performs register 264 renaming. The RAT 206 provides the microinstructions to the reservation stations 208 from which the microinstructions are issued to the execution units 212 for execution out of program order as the source operands of each microinstruction become available and an execution unit 212 is available to execute the microinstruction. The retire unit 214 retires instructions in program order by writing the results of the microinstructions executed by the execution units 212 to architectural state of the core 102. The execution units 212 may include a load/store unit, integer units, floating-point units, branch units, SIMD units and the like. The load unit reads data from a level-1 (L1) data cache and the store unit writes data to the L1 data cache. A level-2 (L2) cache may back the L1 data cache and the instruction cache 202.

The instruction translator 294 receives blocks of macroinstructions 242 from the instruction cache 202 of FIG. 1. The macroinstructions 242 are also referred to as architectural instructions 242 or ISA instructions 242. The instruction translator 294 translates the ISA instructions 242 into implementing microinstructions 226 that are provided to the RAT 206. The instruction translator 294 includes a simple instruction translator (SIT) 204 that outputs implementing microinstructions 244 and a microcode address 252; a complex instruction translator (CIT) 296 (also referred to as a microcode unit 296) that receives the microcode address 252 and provides implementing microinstructions 246; and a mux 292 that receives microinstructions 244 from the simple instruction translator 204 on one input and that receives the microinstructions 246 from the complex instruction translator 296 on the other input and that provides the implementing microinstructions 226 to the execution pipeline 212 of FIG. 1 based on a select control input 248.

The complex instruction translator 296 includes the microsequencer 236 that receives the microcode address 252 and that maintains a micro-program counter (micro-PC) 232; the core ROM 104 of FIG. 1 that receives a microcode fetch address 254 that is based on the micro-PC 232; the uncore ROM 108 of FIG. 1 that receives the microcode fetch address 254 via bus 112; an instruction indirection register (IIR) 235; a mux 222 that receives microcode instructions 251 from the unshared core ROM 104 on a first input and receives microcode instructions 249 (via bus 112) from the shared uncore ROM 108 on a second input and outputs microcode instructions 247 based on a select control input 245 generated by the microsequencer 236; a decompression unit 239 that receives the microcode instructions 247 from the mux 222 and selectively decompresses the microcode instructions 247 to generate uncompressed microcode instructions 253; and a microtranslator 237 that translates the uncompressed microcode instructions 252 received from the decompression unit 239 to generate the implementing microinstructions 246 output by the complex instruction translator 296. Both the implementing microinstructions 244 generated by the simple instruction translator 204 and the implementing microinstructions 246 generated by the complex instruction translator 296 are microinstructions 226 of the microinstruction set of the microarchitecture of the microprocessor 100 and which are executable by the execution pipeline 212.

The mux 292 is controlled by the select input 248. Normally, the mux 292 selects the microinstructions 244 from the simple instruction translator 204; however, when the simple instruction translator 204 encounters a complex ISA instruction 242 and transfers control, or traps, to the complex instruction translator 296, the simple instruction translator 204 controls the select input 248 to cause the mux 292 to select microinstructions 246 from the complex instruction translator 296. When the RAT 206 encounters a microinstruction 226 with a special bit set to indicate it is the last microinstruction 226 in the sequence implementing the complex ISA instruction 242, referred to herein at the ".T" bit, the RAT 206 controls the select input 248 to cause the mux 292 to return to selecting microinstructions 244 from the simple instruction translator 204. Additionally, the retire unit 214 controls the select input 248 to cause the mux 292 to select microinstructions 246 from the complex instruction translator 296 when the retire unit 214 is ready to retire a microinstruction 226 whose status requires such, for example if the status indicates the microinstruction 226 has caused an exception condition.

The simple instruction translator 204 receives the ISA instructions 242 and decodes them to determine whether the ISA instructions 242 are simple or complex ISA instructions. A simple ISA instruction 242 is one for which the simple instruction translator 204 can emit all the implementing microinstructions 226 that implement the ISA instruction 242; that is, the complex instruction translator 296 does not provide any of the implementing microinstructions 226 for a simple ISA instruction 242. In contrast, a complex ISA instruction 242 requires the complex instruction translator 296 to provide at least some, if not all, of the implementing microinstructions 226. In one embodiment, for a subset of the ISA instructions 242, the simple instruction translator 204 emits a portion of the microinstructions 244 that implement the ISA instruction 242 and then transfers control to the complex instruction translator 296, which subsequently emits the remainder of the microinstructions 246 that implement the ISA instruction 242. The mux 292 is controlled to first provide the implementing microinstructions 244 from the simple instruction translator 204 as microinstructions 226 to the execution pipeline 212 and second to provide the implementing microinstructions 246 from the complex instruction translator 296 as microinstructions 226 to the execution pipeline 212. The simple instruction translator 204 knows the starting microcode address of the various microcode routines employed by the instruction translator 294 to generate the implementing microinstructions 226 for various complex ISA instructions 242, and when the simple instruction translator 204 decodes a complex ISA instruction 242, it provides the relevant microcode routine address 252 to the micro-PC 232 of the complex instruction translator 296. The simple instruction translator 204 emits all the microinstructions 244 needed to implement a relatively large percentage of the ISA instructions 242, particularly ISA instructions 242 that tend to be performed by ISA machine language programs with a high frequency, and only a relatively small percentage requires the complex instruction translator 296 to provide implementing microinstructions 246. In one embodiment, the simple instruction translator 204 is a block of Boolean logic gates synthesized using well-known synthesis tools.

The complex instruction translator 296 outputs a sequence of implementing microinstructions 246 to the mux 292. The microcode ROMs 104/108 store selectively compressed microcode instructions 251/249 of microcode routines. The microcode ROMs 104/108 output the selectively compressed microcode instructions 251/249 in response to the microcode fetch address 254, which is held by the micro-PC 232. Typically, the micro-PC 232 receives its initial value 252 from the simple instruction translator 204 in response to the simple instruction translator 204 decoding a complex ISA instruction 242. In other cases, such as in response to a reset or exception, the micro-PC 232 receives the address of the reset microcode routine address or appropriate microcode exception handler address, respectively. Normally, the microsequencer 236 increments the micro-PC 232 by the size of a microcode instruction (which is one (1) in embodiments in which the size of a microcode instruction is the size of a word in the ROMs 104/108) to sequence through microcode routines. Alternatively, the microsequencer 236 updates the micro-PC 236 to a target address 224 generated by the microtranslator 237 in response to decoding a control type microcode instruction, such as a branch instruction, or to a target address generated by the execution pipeline 212 in response to execution of a control type microinstruction 226, to effect a branch to non-sequential locations in the microcode ROMs 104/108. The microcode ROMs 104/108 are manufactured within the semiconductor die of the microprocessor 100.

In addition to the microinstructions 244 that implement a simple ISA instruction 242 or a portion of a complex ISA instruction 242, the simple instruction translator 204 also generates ISA instruction information 255 that is written to the instruction indirection register (IIR) 235. The ISA instruction information 255 stored in the IIR 235 includes information about the ISA instruction 242 being translated, for example, information identifying the source and destination registers specified by the ISA instruction 242 and the form of the ISA instruction 242, such as whether the ISA instruction 242 operates on an operand in memory or in an architectural register 264 of the microprocessor 100. This enables the microcode routines to be generic, i.e., without having to have a different microcode routine for each different source and/or destination architectural register 264. In particular, the simple instruction translator 204 is knowledgeable of the register file 264 and translates the register information provided in the ISA instruction 242 to the appropriate register in the register file 264 via the ISA instruction information 255. The ISA instruction information 255 also includes a displacement field, an immediate field, a constant field, rename information for each source operand as well as for the microinstruction 226 itself, information to indicate the first and last microinstruction 226 in the sequence of microinstructions 226 that implement the ISA instruction 242, and other bits of useful information gleaned from the decode of the ISA instruction 242 by the simple instruction translator 204.

The microtranslator 237 receives the uncompressed microcode instructions 253 from the decompression unit 239 and the contents of the IIR 235. In response, the microtranslator 237 generates implementing microinstructions 246. The microtranslator 237 translates certain microcode instructions 253 into different sequences of microinstructions 246 depending upon the information received from the IIR 235, such as depending upon the form of the ISA instruction 242 and the source and/or destination architectural register 264 combinations specified by them. In some cases, much of the ISA instruction information 255 is merged with the uncompressed microcode instruction 253 to generate the implementing microinstructions 246. In one embodiment, each uncompressed microcode instruction 253 is 38 bits wide and each microinstruction 246 is approximately 200 bits wide. In one embodiment, the microtranslator 237 is capable of generating up to three microinstructions 246 from an uncompressed microcode instruction 253. The microtranslator 237 comprises Boolean logic gates that generate the implementing microinstructions 246.

An advantage provided by the microtranslator 237 is that the size of the microcode ROMs 104/108 may be reduced since they do not need to store the ISA instruction information 255 provided by the IIR 235 since the simple instruction translator 204 generates the ISA instruction information 255. Furthermore, the microcode routines may include fewer conditional branch instructions because they do not need to include a separate routine for each different ISA instruction form and for each source and/or destination architectural register 264 combination. For example, if the complex ISA instruction 242 is a memory form, the simple instruction translator 204 may generate a prolog of microinstructions 244 that includes microinstructions 244 to load the source operand from memory into a temporary register 264, and the microtranslator 237 may generate a microinstruction 246 to store the result from the temporary register to memory; whereas, if the complex ISA instruction 242 is a register form, the prolog may move the source operand from the source register specified by the ISA instruction 242 to the temporary register 264, and the microtranslator 237 may generate a microinstruction 246 to move the result from a temporary register to the architectural destination register 264 specified by the IIR 235. In one embodiment, the microtranslator 237 is similar in many respects to the microtranslator 237 described in U.S. patent application Ser. No. 12/766,244, filed on Apr. 23, 2010, which claims priority to U.S. Provisional Application No. 61/234,008, filed Aug. 14, 2009, and which published as U.S. Patent Publication No. 2011/0040953 on Feb. 17, 2011, each of which is hereby incorporated by reference herein in its entirety for all purposes.

In the alternate embodiment, the instruction translator 294 does not include a microtranslator 237 and the microcode instructions 251/249 fetched from the microcode ROMs 104/108—after being selectively decompressed—are microinstructions that are executable by the execution units 212.

It is noted that the micro-PC 232 is distinct from the architectural PC 218; that is, the micro-PC 232 does not hold the address of ISA instructions 242, and the addresses held in the micro-PC 232 are not within the system memory address space.

As stated above, the microcode instructions 247 are non-architectural instructions stored within one or more memories 104/108 of the microprocessor 100 that are fetched by the processing core 102 based on the fetch address 254 stored in the non-architectural micro-PC 232 and used by the core 102 to implement the instructions 242 of the instruction set architecture of the microprocessor 100. The uncompressed microcode instructions 253 are translated by the microtranslator 237 into the microinstructions 246 that are executed by the execution units 212, or in an alternate embodiment the uncompressed microcode instructions 253 are executed directly by the execution units 212 (in which case they are microinstructions 246). That the microcode instructions 253 are non-architectural instructions means they are not instructions of the instruction set architecture (ISA) of the microprocessor 100 but are instead encoded according to an instruction set distinct from the architectural instruction set. The non-architectural micro-PC 232 is not defined by the instruction set architecture of the microprocessor 100 and is distinct from the architecturally-defined program counter 218. The microcode is used to implement some or all of the instructions of the instruction set of the microprocessor's ISA as follows. In response to decoding a microcode-implemented ISA instruction 242, the microprocessor 100, more specifically the simple instruction translator 294, transfers control to a microcode routine associated with the ISA instruction 242. The microcode routine comprises microcode instructions. The execution units 212 execute the microcode instructions 253, or, according to the embodiment of FIG. 2, the microcode instructions 253 are further translated into microinstructions 246 that are executed by the execution units 212. The results of the execution of the microcode instructions 253 (or microinstructions 246 from which the microcode instructions 253 are translated) by the execution units 212 are the results defined by the ISA instruction 242. Thus, the collective execution of the microcode routine associated with the ISA instruction 242 (or of the microinstructions 246 translated from the microcode routine instructions) by the execution units 212 "implements" the ISA instruction 242; that is, the collective execution by the execution units 212 of the implementing microcode instructions 253 (or of the microinstructions 246 translated from the microcode instructions 253) performs the operation specified by the ISA instruction 242 on inputs specified by the ISA instruction 242 to produce a result defined by the ISA instruction 242. Additionally, the microcode instructions may be executed (or translated into microinstructions that are executed) when the microprocessor is reset in order to configure the microprocessor.

In one embodiment, the arbitration logic 106 of FIG. 1 includes a request queue (not shown) that holds requests received from each of the cores 102 to access the uncore ROM 108 or patch RAM 114. In one embodiment, each bus 112 between the arbitration logic 106 and a core 102 includes a request portion and a response portion. On the request portion, the core 102 specifies the fetch address 254 of the microcode instruction word it is requesting. On the response portion, the arbitration logic 106 provides a microcode instruction word, an address, a core number, and a valid indicator. The microcode instruction word, address and core number are only valid if the valid indicator so indicates. The core number specifies the core 102 for which the arbitration logic 106 is providing a response to a previous request to access the uncore ROM 108 or patch RAM 114. The address specifies the address from which the microcode instruction word was fetched from the uncore ROM 108 or patch RAM 114. In one embodiment, the arbitration logic 106 may assert a stall signal on bus 112 to a core 102 to indicate that the arbitration logic 106 cannot receive any more requests from the core 102 to access the uncore ROM 108. The arbitration logic 106 de-asserts the stall signal once it is able to receive requests again. In one embodiment, if the RAT 206 asserts a stall signal to the instruction translator 294 to indicate it cannot receive any more microinstructions 226, then the instruction translator 294 flushes any in-flight access to the uncore ROM 108. Once the RAT 206 de-asserts the stall signal, the microsequencer 236 begins fetching microcode instructions again at the next address after the address of the last microinstruction 226 sent to the RAT 206. In an alternate embodiment, the instruction translator 294 saves the state of the in-flight accesses to the uncore ROM 108 or patch RAM 114 so that it may avoid re-fetching the microcode instructions associated with the in-flight accesses.

The access latency of the uncore ROM 108 is greater than each of the core ROMs 104. In one embodiment, the core ROM 104 has a 3-cycle access latency and the access latency for the uncore ROM 108 is variable in embodiments in which its read port(s) are shared by the plurality of cores 102.

Figure 3:
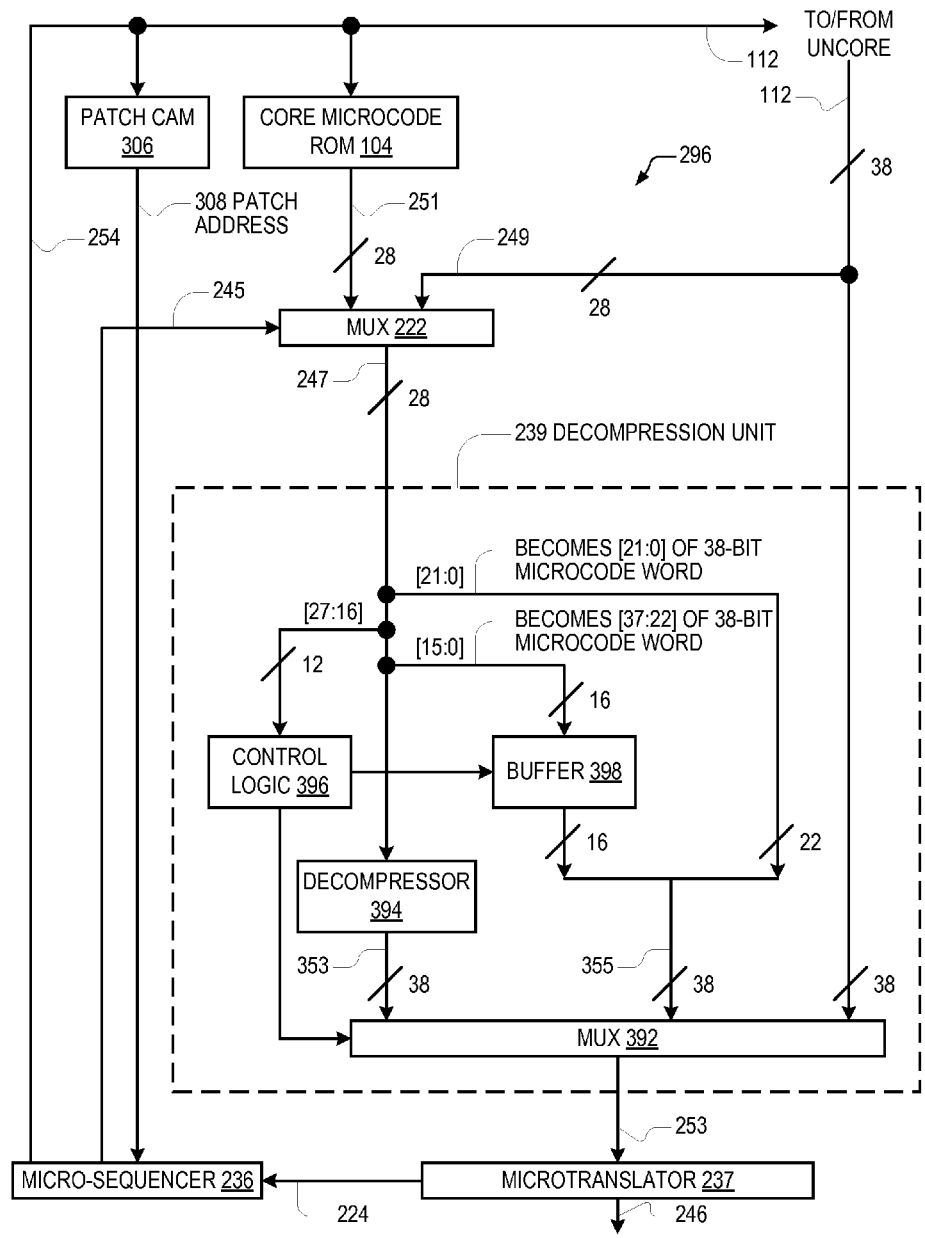
FIG. 3 is a block diagram illustrating in more detail the decompression unit of FIG. 2.

Referring now to FIG. 3, a block diagram illustrating in more detail the decompression unit 239 of FIG. 2 is shown. Also shown in FIG. 3 is a patch content-addressable memory (CAM) 306 that holds patch addresses 308 output by the patch CAM 306 to the microsequencer 236 in response to the fetch address 254 if the fetch address 254 matches the contents of one of the entries in the patch CAM 306. In such case, the microsequencer 236 outputs the patch address 308 as the fetch address 254 rather than the next sequential fetch address (or target address 224), in response to which the uncore patch RAM 114 outputs a patch microcode instruction 249 on the bus 112. This effectuates fetching of a patch microcode instruction 249 from the uncore patch RAM 114, rather fetching an undesirable microcode instruction 249 or 251 from the uncore ROM 108 or the core ROM 104, respectively. Preferably, the patch CAM 306 and patch RAM 114 are loaded in response to architectural instructions included in system software, such as BIOS or the operating system running on the microprocessor 100. The decompression unit 239 includes a decompressor 394, a buffer 298, a 3-input mux 392, and control logic 396.

The decompressor 394 receives a compressed microcode instruction 247 from the mux 222 of FIG. 2 and decompresses the compressed microcode instruction 247 into an uncompressed microcode instruction 353, which is provided to a first input of the mux 392. In one embodiment, the decompressor 394 comprises programmable logic arrays (PLAs) synthesized from register transfer language (RTL) code, such as Verilog® code that is automatically generated by the PLA generator 616 of FIG. 6. Embodiments of the manner in which the decompressor 394 decompresses the compressed microcode instruction 247 are described below in more detail.

The buffer 398 receives bits [15:0] of the 28-bit microcode instruction 247 and loads these bits if instructed to do so by the control logic 396. Otherwise, the buffer 398 retains its previous value. In one embodiment, on a clock cycle subsequent to the clock cycle in which bits [15:0] of the 28-bit microcode instruction 247 are loaded into the buffer 398, the contents of the buffer 398 is joined with bits [21:0] of the current 28-bit microcode word 247 and provided as a 38-bit result 355 to the second input of the mux 392.

The control logic 396 receives bits [27:16] of the microcode word 247 and determines whether its value is the predetermined escape indicator value. In one embodiment, the escape indicator value is 0x3FF. If so, the control logic 396 controls the buffer 398 to load bits [15:0] of the 28-bit microcode instruction 247. Additionally, when the next 28-bit microcode word 247 is provided by the mux 222, the control logic 396 controls the mux 392 to select its second input to provide an uncompressed microcode instruction 253 on its output to the microtranslator 237, i.e., to select the 38-bit result 355 of the joinder of the 16-bit contents of the buffer 398 with bits [21:0] of the current 28-bit microcode word 247. The next 28-bit microcode word 247 will be the next sequential word 249/251 fetched from the uncore ROM 108/core ROM 104 that follows the word 247 that was loaded into the buffer 398.

In an alternate embodiment, the decompression unit 239 may receive in the same clock cycle both of the microcode words that contain the escape indicator and the two pieces of the uncompressed microcode instruction. In such an embodiment, the buffer 398 is bypassed, and the appropriate portions of the adjacent words are joined during the clock cycle and provided to the second input of the mux 392, and the control logic 396 controls the mux 392 to select its second input.

The mux 392 receives on its third input a 38-bit microcode word 112, such as from the uncore patch RAM 114. The control logic 396 controls the mux 392 to select its third input (i.e., 38-bit microcode word 112) if the source of the current microcode instruction is a 38-bit wide memory, such as the uncore patch RAM 114. Otherwise, the control logic 396 controls the mux 392 to select its first or second input. The control logic 396 controls the mux 392 to select its second input (i.e., 38-bit joinder result 355) if the source of the current microcode instruction is a 28-bit wide memory, such as the uncore ROM 108 or the core ROM 104, that stores (in addition to compressed microcode instructions) split portions of uncompressed microcode words that require joinder, and if the previous word included an escape indicator (e.g., 432 of FIG. 4). The control logic 396 controls the mux 392 to select its first input (i.e., 38-bit output 353 of the decompressor 394) if the source of the current microcode instruction is a 28-bit wide memory that stores compressed microcode instructions (in addition to split portions of uncompressed microcode words and escape indicators), and if the current word does not include an escape indicator.

In one embodiment, the 38-bit microcode instruction 253 provided by the mux 392 to the microtranslator 237 includes, according to the format of some instructions, referred to generally as non-immediate instructions, a 13-bit opcode field; a 5-bit first source operand address field; a 5-bit second source operand address field; a 5-bit destination operand address field; a 4-bit size field that specifies the size of operands; a 4-bit field that indicates how each of the 5-bit operand register fields are decoded by the microtranslator 237; the 1-bit ".T" field that indicates whether this microcode instruction is the last instruction in the sequence of microcode instructions that implement an x86 instruction; and an extra bit. The format of other 38-bit microcode instructions 253, referred to generally as immediate instructions, includes a 16-bit immediate field that includes a 16-bit immediate value, such as an immediate operand or a target address of a jump instruction, and a subset of the other fields described above, for example excluding the 5-bit second operand field and a smaller opcode field.

Figure 4:
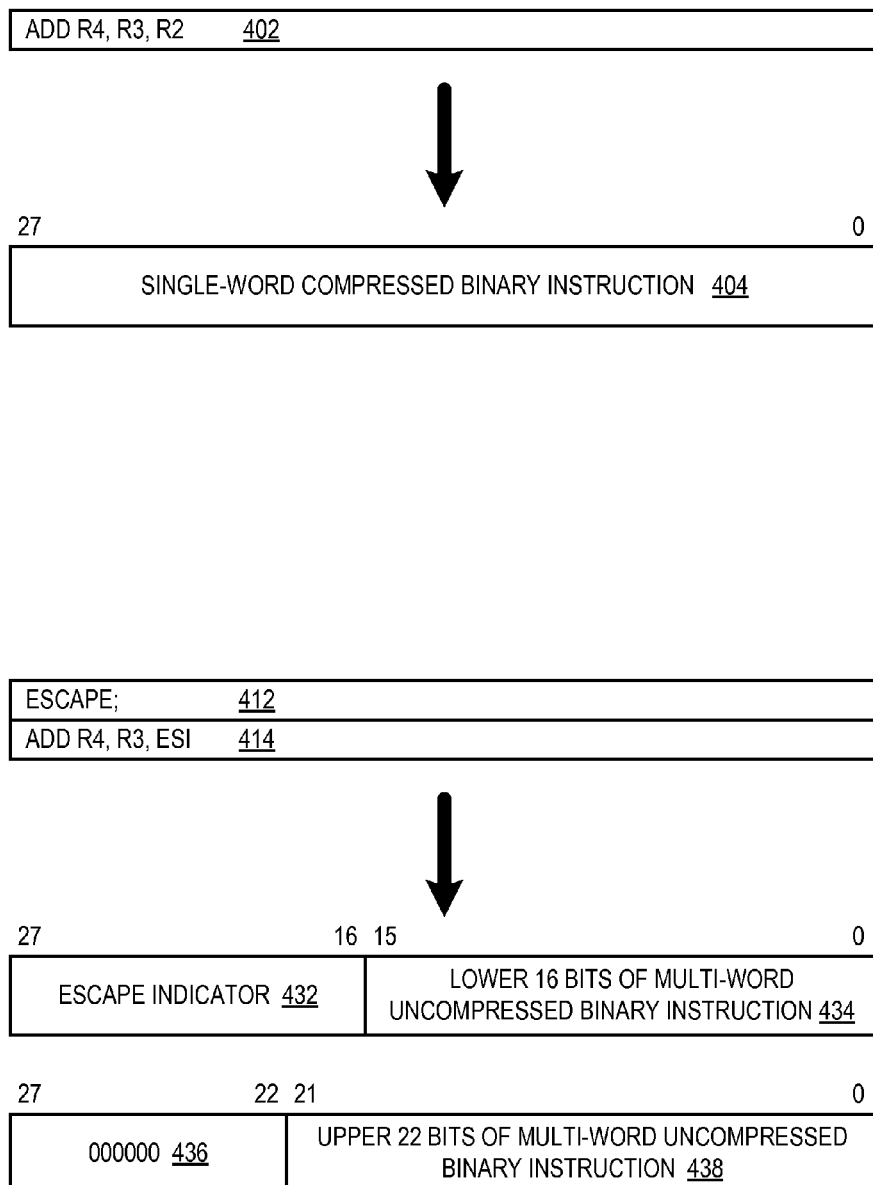
FIG. 4 is a flow diagram illustrating selective compression of microcode instructions by an assembler.

Referring now to FIG. 4, a flow diagram illustrating selective compression of microcode instructions by an assembler is shown. FIG. 4 includes two flow diagrams that illustrate an example of the assembly of a first microcode assembly language instruction 402 into a single-word compressed binary instruction 404, and an example of the assembly of a second microcode assembly language instruction 414 denoted (e.g., preceded) by an escape indicator 412 into a multi-word uncompressed binary instruction that includes an escape indicator.

The first flow diagram illustrates assembly of a first microcode assembly language microcode instruction 402 into a compressed binary instruction 404 for storage as a single word in a microcode memory, such as core ROM 104 and/or uncore ROM 108. In the example of FIG. 4, the single word is 28-bits wide, i.e., the width of the microcode ROM 104/108, as shown. When the single-word compressed binary instruction 404 is fetched from the microcode memory 104/108, it will be decompressed by the decompressor 394 of FIG. 3 into an uncompressed microcode instruction, as described herein. In the example of FIG. 4, the first microcode assembly language microcode instruction 402 adds the contents of general purpose registers R2 and R3 and writes the result to general purpose register R4. In the example, this is a microcode instruction for which a compression table entry exists at the time of assembly, which enables the assembler to compress it, as described in more detail below.

The second flow diagram illustrates assembly of a second assembly language microcode instruction 414, preceded by an escape directive 412, into a multi-word uncompressed binary instruction 424 that is split into two 28-bit words. The first word includes an escape indicator 432 in predetermined bits of the first word. The escape indicator 432 is a predetermined value that the decompression unit 239 of FIG. 2 (more specifically, the control logic 396) is configured to recognize and, in response, to join a remaining portion 434 of the word that includes the escape indicator 432 with a portion 438 of the next word from the microcode memory 104/108. In one embodiment, the escape indicator predetermined value is 0x3FF, and the predetermined bits of the first word are bits [27:16]. However, the predetermined bits and predetermined values are not limited to the exemplary embodiment, and other embodiments are contemplated with a different predetermined value and different predetermined bits. An escape directive is a predetermined string (e.g., "ESCAPE;" as shown in FIG. 4) that a programmer may insert on a line in the microcode source code file before a microcode instruction that will cause the assembler not to attempt to compress the following microcode instruction, but to instead split the instruction into two words the width of a compressed instruction and to include in the first of the binary words an escape indictor 432.

The lower 16 bits of the first word are the lower 16 bits 434 of the multi-word uncompressed binary instruction 424. The upper 22 bits of the second word are the upper 22 bits 438 of the multi-word uncompressed binary instruction 424. The lower 16 bits 434 and the upper 22 bits 438 are joined together by the decompression unit 239 when the control logic 396 detects an escape indicator 432 in the first word. Preferably, the upper 6 bits 436 of second word are zeroes. In the example of FIG. 4, the second microcode assembly language microcode instruction 414 adds the contents of general purpose register R3 and an architectural register (e.g., x86 architectural register ESI) and writes the result to general purpose register R4. In the example, this is a microcode instruction for which a compression table entry does not exist at the time of assembly, which requires the inclusion of an escape directive 412 to avoid generating an assembler error, as described in more detail below.

Figure 5:
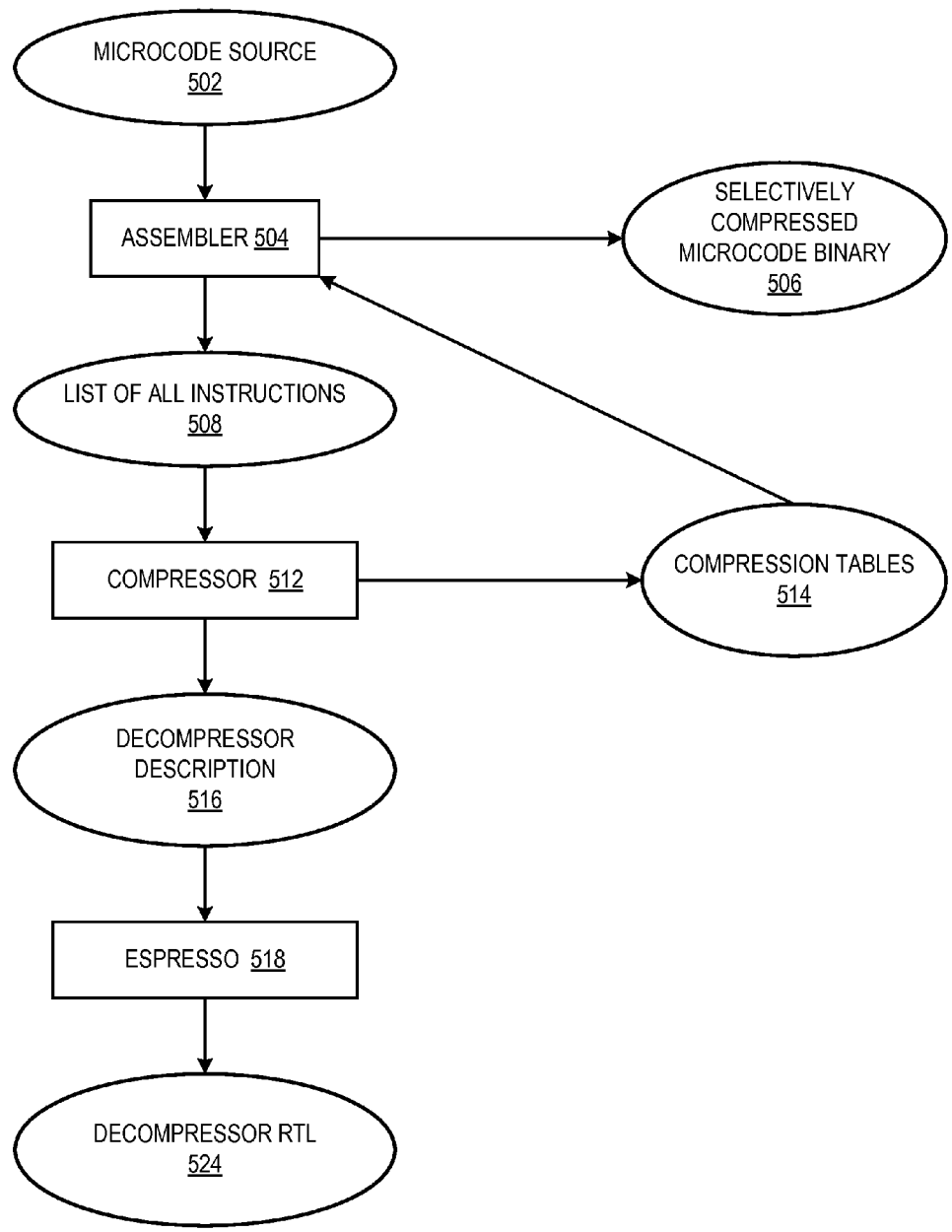
FIG. 5 is a flow diagram illustrating a process for building selectively compressed microcode.

Referring now to FIG. 5, a flow diagram illustrating a process for building selectively compressed microcode is shown. Flow begins with microcode source 502 developed by a microcode designer. The microcode source 502 may include escape directives 412. An assembler 504 receives the microcode source 502 and compression tables 514. Preferably, the compression tables 514 are included in a file generated by a compressor program 512 described below. The assembler 504 assembles the source code 502 using the compression tables 514 to generate a selectively compressed microcode binary 506. The selectively compressed binary 506 includes single-word compressed binary instructions, such as instruction 404 of FIG. 4, and multi-word uncompressed binary instructions that include an escape indicator 432, such as instruction 424 of FIG. 4. The microcode source 502 typically comprises multiple source code files that are assembled together by the assembler 504 to generate the microcode 506.

The assembler 504 also generates a list of all microcode instructions 508 included in the selectively compressed microcode binary 506. In one embodiment, the list of all instructions file 508 is a human-readable listing that contains an entry for each microcode instruction in the microcode binary 506. For each microcode instruction, the entry specifies: (1) its associated address in microcode memory 104/108; (2) its uncompressed binary representation, e.g., its 38-bit binary representation; and (3) a representation of the instruction that is similar to its assembly language representation but modified to facilitate the compressor program 512 to generate the compression tables 514. The uncompressed binary representation is the 38-bit value that is either compressed into a single-word compressed binary instruction 404 or that is split into the lower 16 bits 434 and upper 22 bits 438 of the multi-word uncompressed binary instruction 424 of FIG. 4, depending upon whether the microcode instruction is denoted by an escape directive 412 in the source code 502.

The compressor program 512 receives the list of all instructions 508 and uses it to generate the compression tables 514. The compression tables 514 are input to the assembler 504 on a subsequent assembly instance in which the assembler 504 assembles the source 502 into the selectively compressed microcode binary 506. Typically, the subsequent assembly is of new/modified source 502. Additionally, the subsequent assembly may be of the same source 502 that was originally used to generate the compression tables 514, such as when the compression tables 514 are initially empty.

The compressor 512 goes through the list of all instructions 508 and generates a list of unique instructions. For example, the list of all instructions 508 may include multiple instances of an instruction that subtracts R1 from R2 and places the result in R3; however, the compressor 512 treats all of the instances as a single unique instruction when it generates the list of unique instructions. One fact that enables the microcode to be compressed is the high probability that, for many microcode instructions, multiple instances of the same instruction will be present in the source code 502. The criteria for a microcode instruction to be unique may vary for different embodiments depending upon the compression method used. An embodiment is described below in detail. In one embodiment, the compressor program 512 is a program written in the Python language.

After generating the list of unique instructions, the compressor 512 assigns each unique microcode instruction a corresponding unique compression value. The compression tables 514 comprise a one-to-one mapping of unique microcode instructions to unique compression values. The assembler 504 uses the mapping during a subsequent assembly instance to compress the source code 502 assembly language instructions that are not preceded by an escape directive into compressed instructions 404. The compression value is a binary value that becomes the single-word compressed binary instruction 404, or preferably a portion thereof, that the decompressor 394 decompresses into the uncompressed microcode instruction 353, or preferably a portion thereof. Preferably, only a portion of the bits of the 38-bit uncompressed binary representation are compressed and the remaining bits are not compressed. In one embodiment, 22 bits of the 38-bit uncompressed binary representation are compressed into 12 bits of the 28-bit compressed binary instruction 404, and the remaining 16 bits of the 38-bit uncompressed binary representation are passed through uncompressed into 16 bits of the 28-bit compressed binary instruction 404. As described below, the decompressor 394 performs a similar process in reverse.

In one embodiment, the compressor 512 generates three compression tables 514. One of the compression tables 514 specifies the unique compression value mapping for immediate jump microcode instructions; one of the compression tables 514 specifies the unique compression value mapping for immediate non jump microcode instructions; and one of the compression tables 514 specifies the unique compression value mapping for all other microcode instructions, referred to herein as "miscellaneous" microcode instructions. In one embodiment, compressed immediate jump instructions 404 have a binary one (1) value in the upper bit (i.e., bit [27]), whereas immediate non jump and the miscellaneous microcode instructions 404 have a binary zero (0) value in the upper bit, and the immediate non jump instructions 404 have values of bits [26:16] in the range of 0x000 to 0x2FF, and the miscellaneous microcode instructions 404 have values of bits [26:16] in the range of 0x300 to 0x7FF. In one embodiment, the immediate value of the immediate jump and non jump microcode instructions 404 resides in bits [15:0] of the 28-bit microcode word 247.

The compressor 512 also generates a decompressor description 516. The decompressor description 516 may be conceptualized as the inverse of the compression tables 514. That is, the decompressor description 516 comprises a one-to-one mapping of the unique compression values included in the compression tables 514 to unique uncompressed microcode instruction binary representations, or preferably a portion thereof. As discussed above, preferably the decompressor 394 passes through a portion of the bits (16 bits in one embodiment) of the compressed microcode instruction 247, such that the decompressor description 516 need only comprise a one-to-one mapping of unique 12-bit compression values to unique 22-bit portions of the uncompressed microcode instruction binary representations. The decompressor 394 combines the unique 22-bit portion with the passed through 16-bit portion to generate the 38-bit uncompressed microcode instructions 253 that are ultimately provided to the microtranslator 237. Thus, in one embodiment, the decompressor description 516 maps each unique 12-bit compression value included in the compression tables 514 to a unique 22-bit value, and the mapping is used to fabricate or simulate the decompressor 394 that outputs the unique 22-bit value as a portion of the uncompressed microcode instruction 353 in response to receiving the corresponding unique 12-bit compression value of bits [27:16] of the compressed microcode instruction 247.

A logic generator program 518, such as the well-known Espresso logic minimizer program, turns the decompressor description 516 into a decompressor register transfer language (RTL) file 524 that may be used to fabricate or simulate the decompressor 394. Preferably, the decompressor register RTL 524 is synthesized into programmable logic arrays (PLAs) that form the decompressor 394.

Once an instance of the microprocessor 100—in particular of the hardware decompressor 394—has been manufactured or simulated using a given instance of the decompressor RTL 524, subsequent microcode binaries 506 for execution by the instance of the microprocessor 100 must be assembled by the assembler 504 using the instance of the compression tables 514 that correspond to the instance of the decompressor description 516 from which the decompressor RTL 524 was generated. Otherwise, the decompressor 394 would decompress the microcode binary 506 incorrectly.

For example, a microcode binary 506 for execution by an instance of a software simulator of the microprocessor 100 must be assembled by the assembler 504 using the instance of the compression tables 514 that correspond to the instance of the decompressor description 516 from which the decompressor RTL 524 used in the software simulator was generated. For another example, in an embodiment in which a microcode patch for loading into the uncore patch RAM 114 are selectively compressed, the microcode patch binary 506 must be assembled by the assembler 504 using the instance of the compression tables 514 that correspond to the instance of the decompressor description 516 from which the decompressor RTL 524 was generated and which was used to manufacture the instance of the microprocessor 100.

For another example, a microprocessor has many semiconductor layers, and typically the microcode memories 104/108 are in the last layers to be fabricated. This provides an opportunity for microcode developers to continue to develop the microcode while the earlier-fabricated layers—in which the decompressor 394 may be included—of an instance of the microprocessor 100 are fabricated. In such case, the microcode binary 506 must be assembled by the assembler 504 using the instance of the compression tables 514 that correspond to the instance of the decompressor description 516 from which the decompressor RTL 524 used to fabricate the instance of the microprocessor 100 was generated. This may be particularly advantageous since it may provide the microcode designer multiple weeks in some cases to continue to develop the microcode after the hardware design has been frozen. In such case, the source code 502 may include microcode instructions that are new in the sense that they are not in the list of all microcode instructions 508 that were used to generate the decompressor RTL 524 from which the instance of the microprocessor 100 was fabricated. In this case, the microcode designer will need to insert escape directives 412 into the microcode source 502 before the new microcode instructions, such as described at block 608 of FIG. 6 below.

Figure 6:
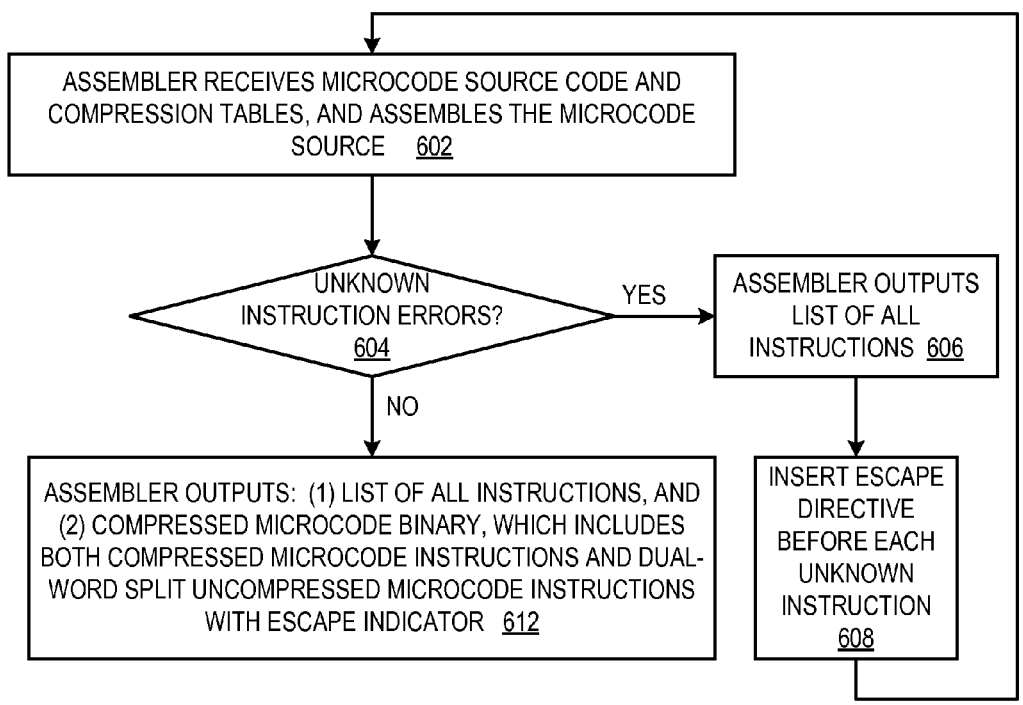
FIG. 6 is a flowchart illustrating a process for assembling microcode by an assembler.

Referring now to FIG. 6, a flowchart illustrating a process for assembling microcode by an assembler is shown. Flow begins at block 602.

At block 602, the assembler 504 receives microcode source code 502 and compression tables 514 of FIG. 5. The assembler 504 assembles the source code 502 using the compression tables 514. The source code 502 may contain escape directives 412. During an initial assembly instance, the compression tables 514 may be empty. It is noted that the microcode developer may not know whether he has inserted a new microcode instruction into the source code 502, i.e., an instruction for which a mapping is not included in the current compression tables 514. In such case, as the assembler 504 assembles the source code 502 it will generate an associated error. Flow proceeds to decision block 604.

At decision block 604, if the assembler 504 determines that there were errors during the assembly at block 602, flow proceeds to block 606; otherwise, flow proceeds to block 612. In particular, the assembly errors may be caused by the fact that the compression tables 514 do not include a mapping for one or more of the microcode instructions of the source code 502 that are not denoted by an escape directive 412.

At block 606, the assembler 504 outputs the list of all instructions 508 for the source code 502. Flow proceeds to block 608.

At block 608, escape directives 412 are inserted into the source code 502 before each microcode instruction for which the assembler 504 generated an error caused by the fact that the compression tables 514 do not include a mapping for the microcode instruction. Preferably, a microcode designer inserts the escape directives 412. In one embodiment, a program automatically inserts the escape directives 412 using the error messages generated by the assembler 504. Flow returns to block 602 for another instance of the assembly of the source code 502 until no errors are generated. It may be observed that the compression tables 514 will be empty the first time the microcode source 502 is assembled, in which case the assembler 504 will generate errors for all the microcode instructions in the source code 504; however, because the assembler generated the list of all instructions 508, the compressor 512 may be run to generate the compression tables 514, and the same microcode source 502 (without inserting escape directives 412) may then be re-assembled to generate a selectively compressed microcode binary 506 that may be executed by an instance of the microprocessor 100 that includes a decompressor 394 instance generated from the decompressor RTL 524 generated from the decompressor description 516 generated by the compressor 512 in the second instance.

At block 612, the assembler 504 outputs the list of all instructions 508 and the selectively compressed microcode binary 506 that may be used to manufacture the microprocessor 100. More specifically, the microcode binary file 506 includes single-word compressed microcode binary instructions 404 and multi-word uncompressed binary instructions 424 for inclusion in the uncore ROM 108, core ROMs 104 and/or uncore patch RAM 114. Flow ends at block 612.

Figure 7:
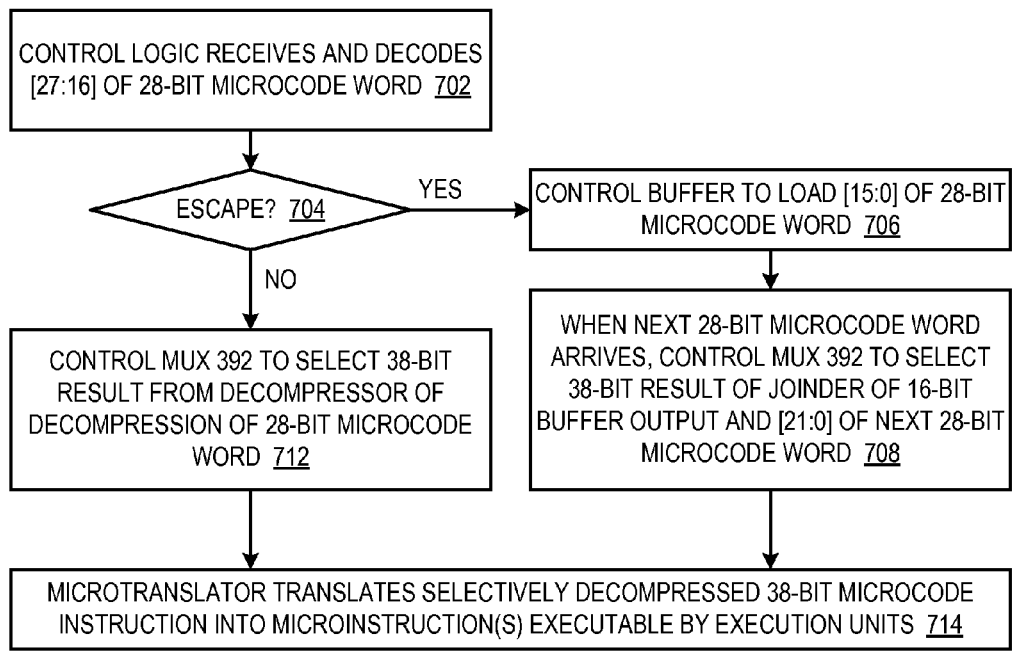
FIG. 7 is a flowchart illustrating operation of the complex instruction translator of FIG. 2, and particularly the decompression unit of FIG. 3.

Referring now to FIG. 7, a flowchart illustrating operation of the complex instruction translator 296 of FIG. 2, and particularly the decompression unit 239 of FIG. 3, is shown. Flow begins at block 702.

At block 702, the control logic 396 of FIG. 3 receives bits [27:16] of the 28-bit microcode word 247 of FIG. 2 and decodes it. Flow proceeds to decision block 704.

At decision block 704, the control logic 396 determines whether the current 28-bit microcode word 247 decoded at block 702 includes an escape indicator. In one embodiment, the control logic 396 determines that the current 28-bit microcode word 247 includes an escape indicator if predetermined bits of the 28-bit microcode word 247 equal a predetermined value. In one embodiment, the predetermined bits are bits [27:16], and the predetermined value is 0x3FF. However, the predetermined bits and predetermined values are not limited to the exemplary embodiment. If the current 28-bit microcode word 247 includes an escape indicator, flow proceeds to block 706; otherwise, flow proceeds to block 712.

At block 706, the control logic 396 control the buffer 398 to load bits [15:0] of the 28-bit microcode word 247. Flow proceeds to block 708.

At block 708, when the next 28-bit microcode word 247 arrives (e.g., from the core microcode ROM 104 or the uncore microcode ROM 108), the control logic 396 controls the mux 392 to select the 38-bit result 355 of the joinder of the 16 bits output by the buffer 398 (i.e., bits [15:0] of the 28-bit microcode word 247 decoded at block 702) and bits [21:0] of the next 28-bit microcode word 247 and to output the selected result 355 as the selectively decompressed 38-bit microcode instruction 253, which in this case was not decompressed. In one embodiment, the next 28-bit microcode word 247 may not arrive for a relatively large number of clock cycles due to a pipeline stall, or contention with the other cores 102 for use of the uncore microcode ROM 108. Flow proceeds to block 714.

At block 712, the decompressor 394 decompresses the 28-bit compressed microcode instruction 247 into a 38-bit uncompressed microcode instruction 353. As described above, in one embodiment, the decompressor 394 maps 12 bits of the 28-bit compressed microcode instruction 247 to 22 bits of the 38-bit uncompressed microcode instruction 353, and the decompressor 394 passes through the remaining 16 bits of the 28-bit compressed microcode instruction 247 that are combined with the mapped 22 bits to generate the 38-bit uncompressed microcode instruction 353. In one embodiment, the decompressor 394 also comprises muxes that direct the various bits of the mapped 22 bits and of the passed through 16 bits into various bit positions of the 38-bit uncompressed microcode instruction 353 in response to select signals generated by the logic that decodes the 28-bit compressed microcode instruction 247. For example, in the embodiment in which the compressor 512 generates three compression tables 514 for mapping immediate jump, immediate non jump and miscellaneous microcode instructions, the muxes direct the mapped 22 bits and passed through 16 bits into various bit positions of the 38-bit uncompressed microcode instruction 353 differently depending upon which of the three types of microcode instructions is being decompressed. For example, in one embodiment, in the case of the immediate type microcode instructions, the muxes direct the passed through 16 bits directly to the immediate field of the 38-bit uncompressed microcode instruction 353, although the location of the immediate field in the jump and non jump immediate type instructions 353 is different; whereas, in the case of a miscellaneous instruction, the muxes direct sub-portions of the passed through 16 bits to different fields and/or sub-fields of the non-immediate type microcode instructions 353; and the muxes direct sub-portions of the mapped 22 bits to different fields and/or sub-fields of the 38-bit microcode instructions 353 depending upon which of the three types of microcode instructions 247 is being decompressed. The control logic 396 controls the mux 392 to select the 38-bit result 353 from the decompressor 394 and output the selected result 353 as the selectively decompressed 38-bit microcode instruction 253, which in this case is the decompression of the current 28-bit microcode word 247 that was decoded at block 702. Flow proceeds to block 714.

At block 714, the microtranslator 237 translates the selectively decompressed 38-bit microcode instruction 253 into microinstructions 246 executable by the execution units 212 of the microprocessor 100. Flow ends at block 714.

Figure 8:
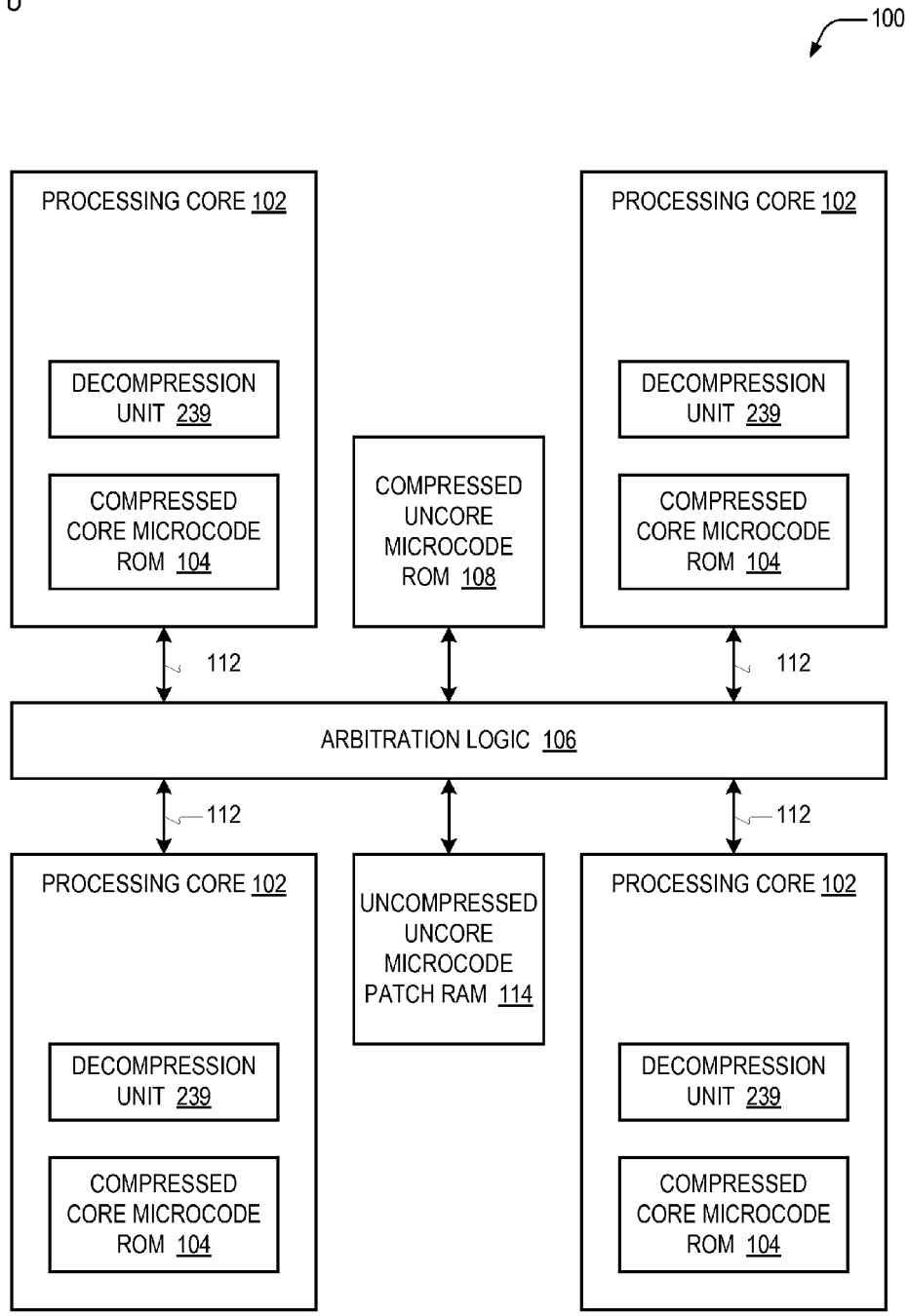
FIGS. 8-13 are block diagrams illustrating alternate embodiments of a microprocessor with microcode memories holding different combinations of compressed and uncompressed microcode instructions.
Figure 9:
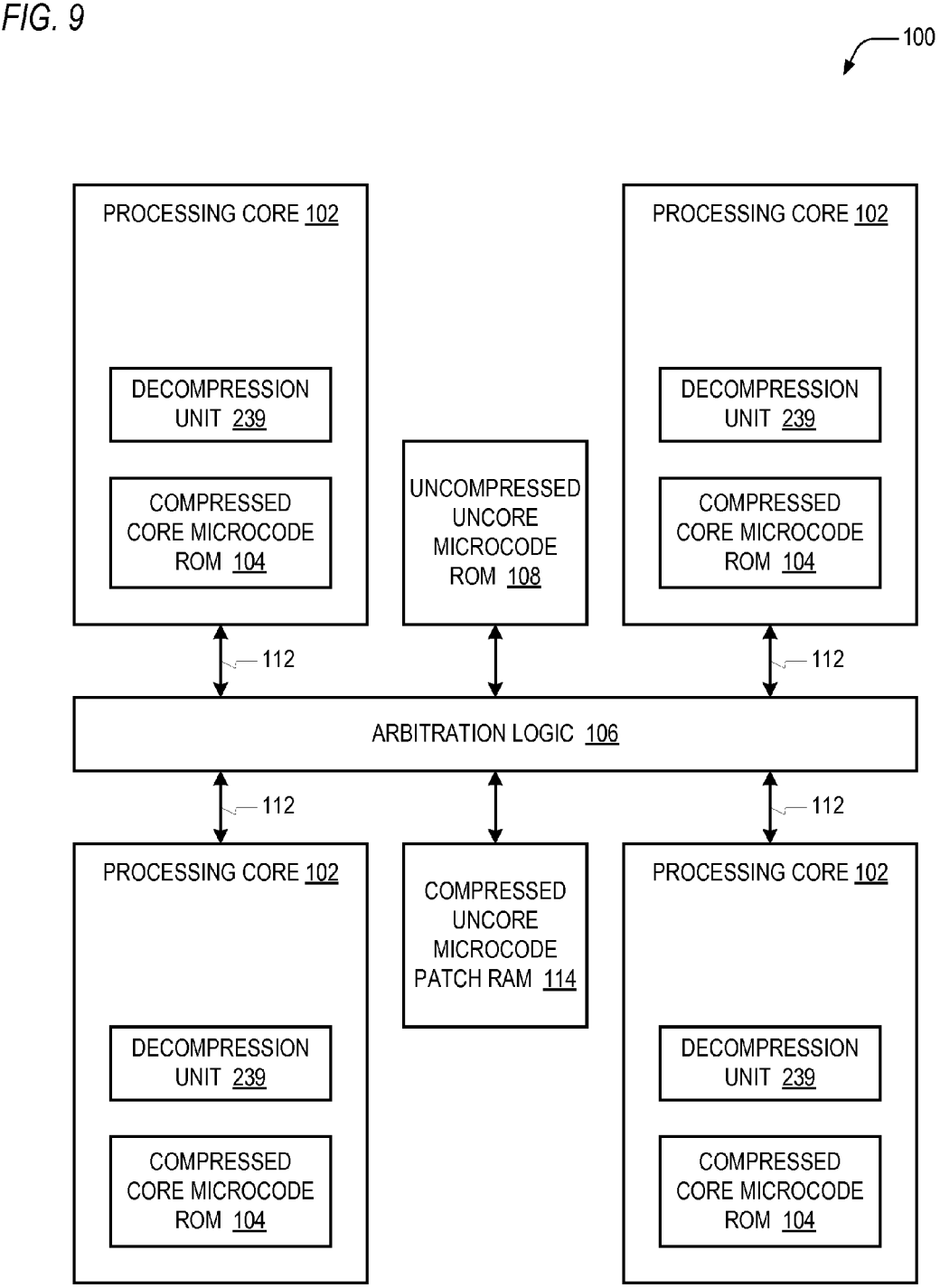
Figure 10:
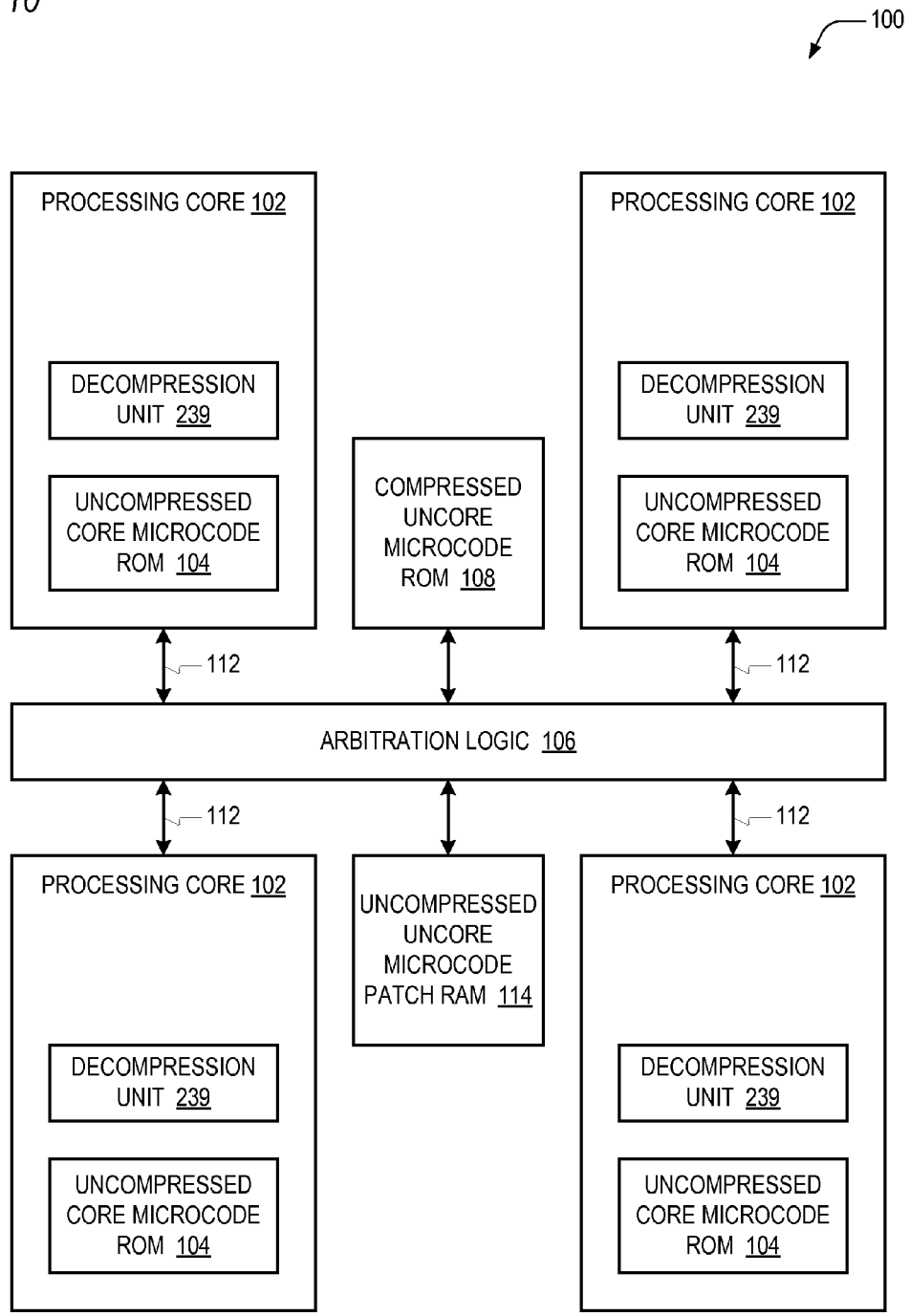
Figure 11:
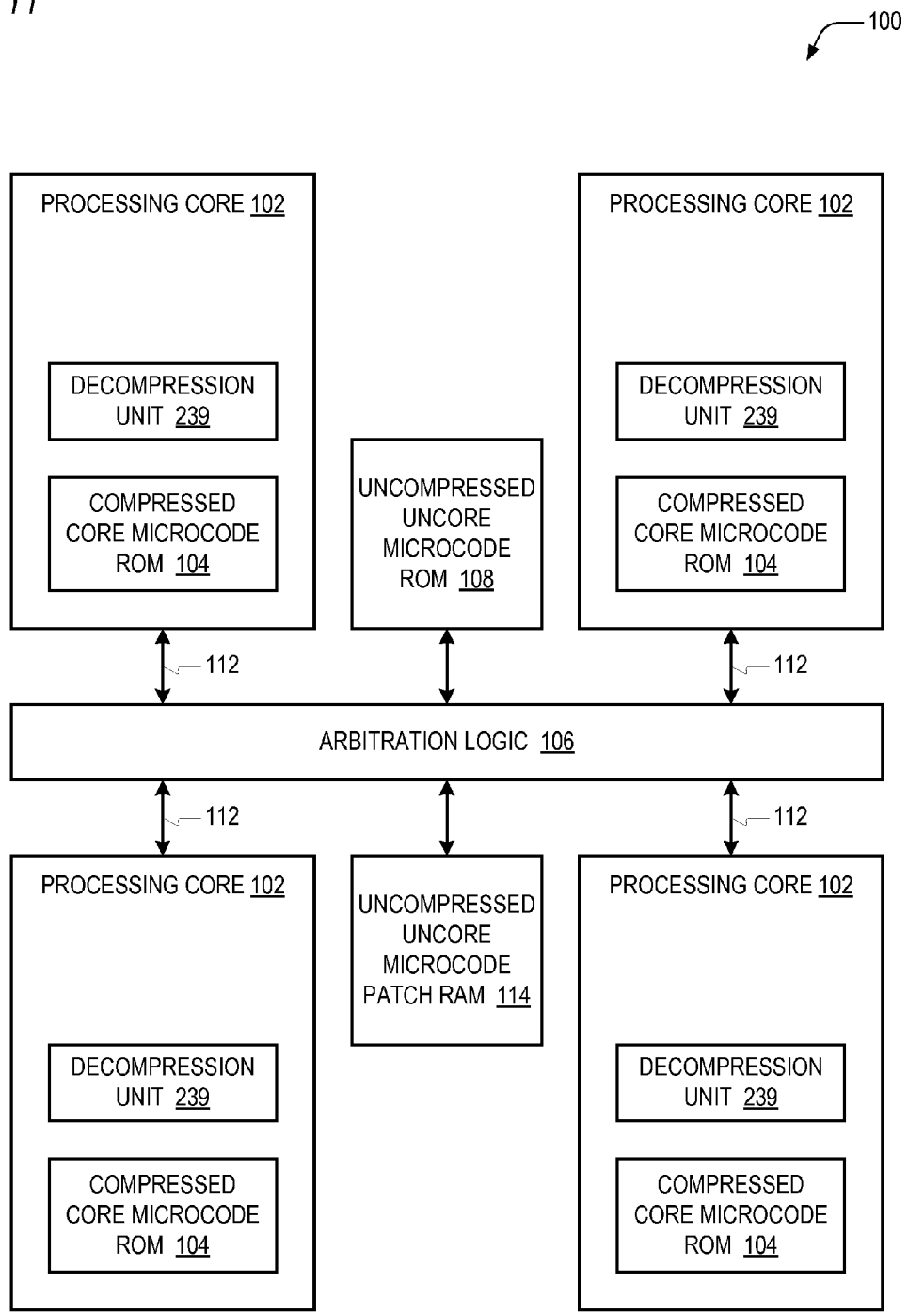
Figure 12:
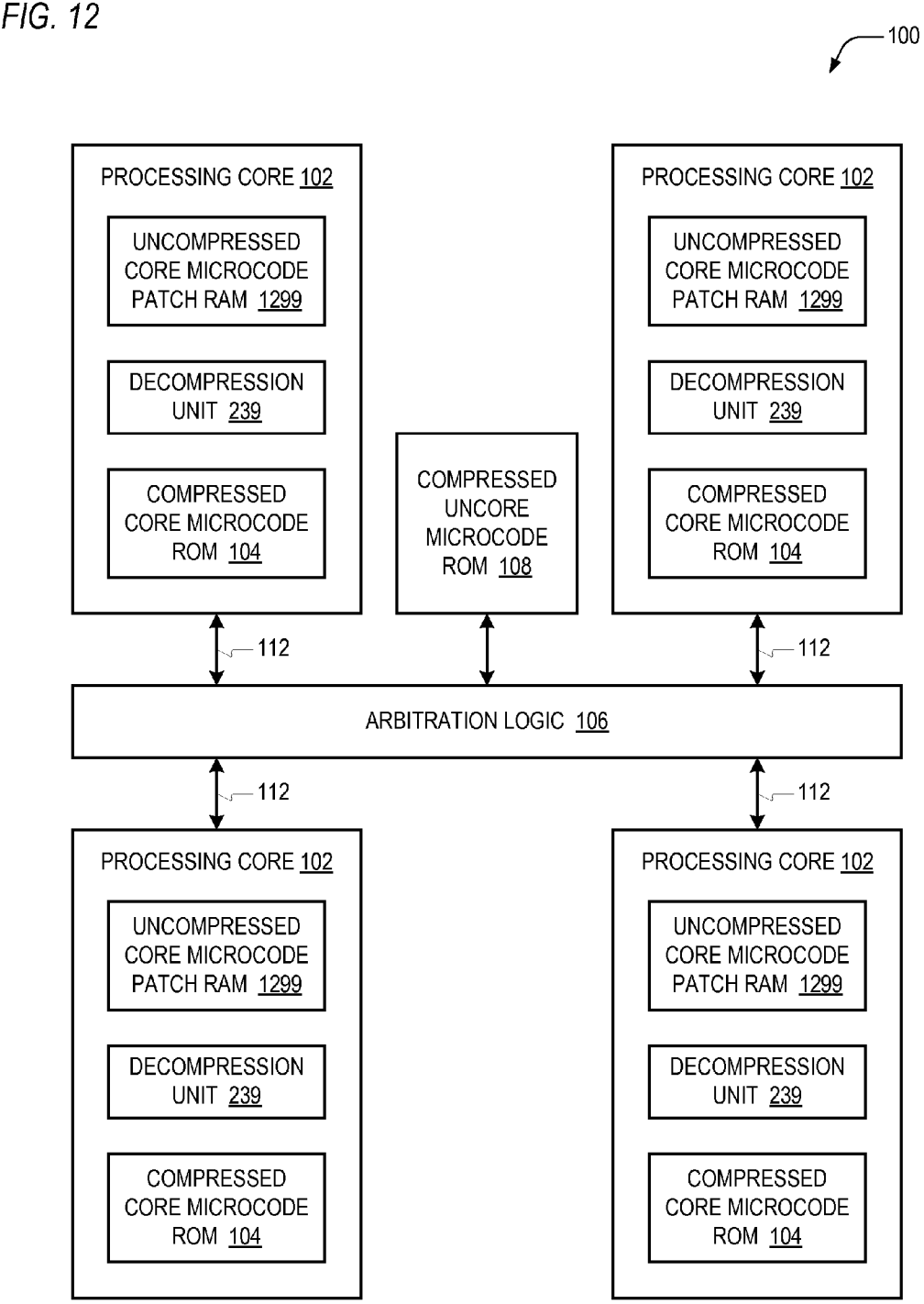
Figure 13:
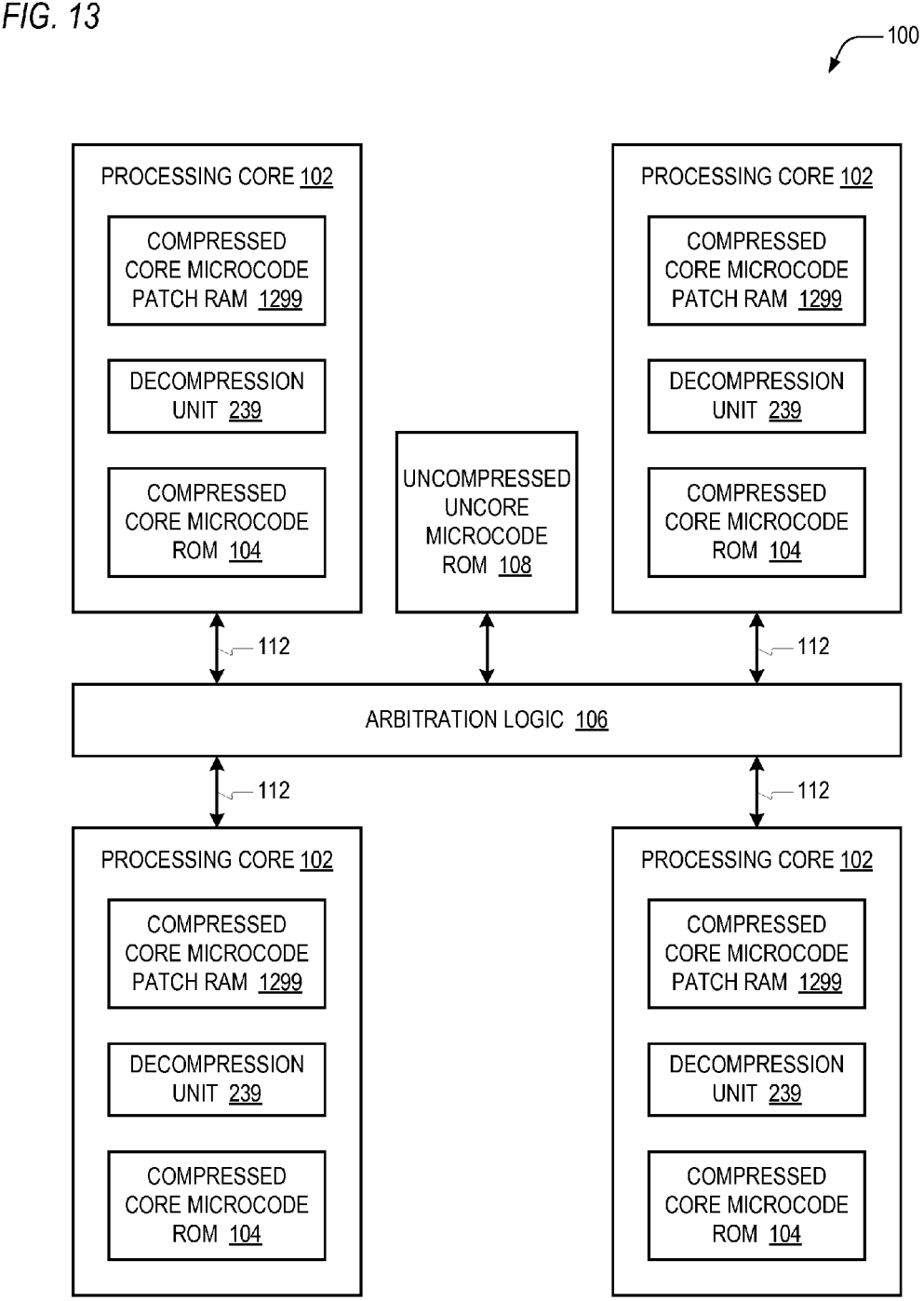

FIG. 8 shows an embodiment in which the uncore microcode ROM 108 is 28-bits wide and holds compressed microcode words, the core microcode ROM 104 is 28-bits wide and holds compressed microcode words, and the uncore patch microcode ROM 114 is 38-bits wide and holds uncompressed microcode words. In an alternate embodiment, the uncore microcode ROM 108 is 38-bits wide and holds uncompressed microcode words rather than compressed microcode words, as shown in FIGS. 9, 11 and 13, in which case the mux 392 may receive on an input a 38-bit microcode word from the uncore microcode ROM 108. In an alternate embodiment, the core microcode ROM 104 is 38-bits wide and holds uncompressed microcode words rather than compressed microcode words, as shown in FIG. 10, in which case the mux 392 may receive on an input a 38-bit microcode word from the core microcode ROM 104. In an alternate embodiment, the uncore patch RAM 114 is 28-bits wide and holds compressed microcode words rather than uncompressed microcode words, as shown in FIG. 9, in which case the 28-bit microcode word from the uncore patch RAM 114 may be provided to an input on mux 222 and selected for provision to the mux 392, decompressor 394, control logic 396 and buffer 398. Furthermore, in an alternate embodiment, each core 102 includes a core patch RAM 1299 that functions similarly to the uncore patch RAM 114, except that it is not shared by the cores 102 but is instead private to its respective core 102, as shown in FIGS. 12 and 13. In the embodiment of FIG. 12, the core patch RAM 1299 is 38-bits wide and holds uncompressed microcode words, in which case the mux 392 may receive on an input a 38-bit microcode word from the core patch RAM 1299. In the embodiment of FIG. 13, the core patch RAM 1299 is 28-bits wide and holds compressed microcode words, in which case the mux 222 may receive on an input a 28-bit microcode word from the core patch RAM 1299. As described herein, in each embodiment in which the microcode memory is 28-bits wide and holds compressed microcode words, the microcode memory may also include multi-word uncompressed binary instructions 424 that are split into two 28-bit words.

Another advantage of the selectively compressed microcode capability described herein is that as programmable non-volatile memories for storing microcode in microprocessors become more commercially viable, the microcode may be developed all the way up until the time the microcode memories of the microprocessor 100 parts are programmed. Furthermore, if the parts/memories are programmable in the field, e.g., by the user or a field technician, then the user/technician may even re-program the parts in the field to fix bugs. In either case, the new microcode source 502 may need to include escape directives because the decompressor hardware 394 is fixed at that point in time.

Although embodiments have been described in which the microcode words and memories are specific widths, these embodiments are described by way of example, and other embodiments are contemplated in which the microcode words and memories are different widths. Furthermore, although embodiments have been described in which the width of a compressed microcode instruction is a specific width and the width of an uncompressed microcode instruction is a specific width, these embodiments are described by way of example, and other embodiments are contemplated in which the respective compressed and uncompressed microcode instructions are different widths. Furthermore, although embodiments have been described in which the selectively compressed microcode is employed in a multi-core microprocessor, other embodiments include single core microprocessors that employ selectively compressed microcode and that include microcode memories having compressed microcode instructions and microcode memories having uncompressed microcode instructions. Finally, although embodiments have been described with particular mappings between uncompressed binary representations and compressed binary representations, other embodiments with different mappings are contemplated as may be needed for different microcode instruction sets. In particular, the number of bits that are decompressed may be more or less depending upon the requirements for an acceptable range of delay attributable to the decompression hardware.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a microprocessor core (e.g., embodied, or specified, in a HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device that may be used in a general-purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

The invention claimed is:

1. A microprocessor, comprising:
a plurality of processing cores, each processing core comprising a fetch unit, a decompression unit, and execution units;
wherein each processing core comprises a core microcode memory configured to hold microcode instructions in the form of M-bit wide words of microcode instructions; and
a secondary microcode memory, distinct from said core microcode memories, configured to provide N-bit wide words of microcode instructions, wherein M and N are integers greater than zero and N is different from M;
wherein either the M-bit wide words or the N-bit wide words of microcode instructions, but not both, are compressed, and either the N-bit wide words or the M-bit wide words of microcode instructions, but not both, are uncompressed;
wherein the decompression unit is configured to decompress the compressed microcode instructions after being fetched from one of the memories and before being executed.

2. The microprocessor of claim 1,
wherein said secondary microcode memory is an uncore microcode memory that is located outside any of the processing cores.

3. The microprocessor of claim 2,
wherein each of the core microcode memories is configured to provide compressed microcode instructions; and
wherein the uncore microcode memory is configured to provide words of uncompressed microcode instructions.

4. The microprocessor of claim 3, wherein the uncore microcode memory is writable and is configured to provide words of patch microcode instructions for patching one or more of the compressed microcode instructions of the core microcode memories.

5. The microprocessor of claim 4, further comprising:
a second uncore microcode memory, shared by the plurality of processing cores; and
wherein the first uncore microcode memory is further configured to provide words of patch microcode instructions for patching one or more of the microcode instructions of the second uncore microcode memory.

6. The microprocessor of claim 2,
wherein each of the core microcode memories is configured to provide uncompressed microcode instructions; and
wherein the uncore microcode memory is configured to provide words of compressed microcode instructions.

7. The microprocessor of claim 1, further comprising a patch microcode memory configured to provide words of patch microcode instructions for patching one or more of the microcode instructions of other of the core microcode and secondary microcode memories.

8. The microprocessor of claim 7,
wherein the patch microcode memory is configured to provide words of uncompressed microcode instructions.

9. The microprocessor of claim 1, wherein the decompression unit is configured to pass on the uncompressed microcode instructions without decompression.

10. A method for selectively decompressing microcode instructions in a microprocessor having a plurality of memories each configured to hold microcode instructions, the method comprising:
fetching, from at least a first of the plurality of memories, M-bit wide words of compressed microcode instructions;
fetching, from at least a second of the plurality of memories, N-bit wide words of uncompressed microcode instructions, wherein M and N are integers greater than zero and N is greater than M;
wherein at least one of the first and second of the plurality of memories is located inside a processing core of the microprocessor, the processing core comprising a fetch unit, a decompression unit, and execution units;
decompressing, within the processing core, the compressed microcode instructions fetched from the at least a first of the plurality of memories; and
passing on the uncompressed microcode instructions without decompression.

11. The method of claim 10, wherein the microprocessor further includes a plurality of processing cores each comprising a core microcode memory, and an uncore microcode memory shared by the plurality of processing cores and located outside any of the processing cores, wherein the uncore microcode memory and each of the core microcode memories is one of the plurality of memories configured to hold microcode instructions.

12. The method of claim 11,
wherein said fetching, from at least a first of the plurality of memories, M-bit wide words of compressed microcode instructions comprises fetching the M-bit wide words of compressed microcode instructions from each of the core microcode memories; and
wherein said fetching, from at least a second of the plurality of memories, N-bit wide words of uncompressed microcode instructions comprises fetching the N-bit wide words of uncompressed microcode instructions from the uncore microcode memory.

13. The method of claim 12, wherein the uncore microcode memory is writable, the method further comprising:
fetching, from the uncore microcode memory, words of patch microcode instructions for patching one or more of the compressed microcode instructions of the core microcode memories.

14. The method of claim 13, wherein the microprocessor also includes a second uncore microcode memory, shared by the plurality of processing cores, the method further comprising:
fetching, from the first uncore microcode memory, words of patch microcode instructions for patching one or more of the microcode instructions of the second uncore microcode memory.

15. The method of claim 11,
wherein said fetching, from at least a second of the plurality of memories, N-bit wide words of uncompressed microcode instructions comprises fetching the N-bit wide words of uncompressed microcode instructions from each of the core microcode memories is one of the at least a second of the plurality of memories configured to provide uncompressed microcode instructions; and
wherein said fetching, from at least a first of the plurality of memories, M-bit wide words of compressed microcode instructions comprises fetching the M-bit wide words of compressed microcode instructions from the uncore microcode memory is one of the at least a first of the plurality of memories configured to provide words of compressed microcode instructions.

16. The method of claim 10, further comprising:
fetching, from at least one of the plurality of memories, words of patch microcode instructions for patching one or more of the microcode instructions of other of the plurality of memories.

17. The method of claim 16, wherein the other of the plurality of memories is one of the at least a first of the plurality of memories, wherein said fetching, from at least one of the plurality of memories, words of patch microcode instructions comprises fetching, from the at least one of the plurality of memories, uncompressed words of patch microcode instructions for patching the one or more of the compressed microcode instructions of other of the plurality of memories.

18. A computer program product encoded in at least one non-transitory computer usable medium for use with a computing device, the computer program product comprising:
computer usable program code embodied in said medium, for specifying a microprocessor, the computer usable program code comprising:
first program code for specifying a plurality of processing cores, each processing core comprising a fetch unit, a decompression unit, and execution units;
wherein each processing core comprises a core microcode memory configured to hold microcode instructions in the form of M-bit wide words of microcode instructions;
second program code specifying a secondary microcode memory, distinct from said core microcode memories, that is configured to provide N-bit wide words of microcode instructions, wherein M and N are integers greater than zero and N is different than M;
wherein either the M-bit wide words or the N-bit wide words of microcode instructions, but not both, are compressed, and either the N-bit wide words or the M-bit wide words of microcode instructions, but not both, are uncompressed; and
third program code for specifying the decompression unit, configured to decompress the compressed microcode instructions after being fetched from one of the memories and before being executed.

19. The computer program product of claim 18, wherein the at least one non-transitory computer usable medium is selected from the set of a disk, tape, or other magnetic, optical, or electronic storage medium.

* * * * *